United States Patent
Lee et al.

(10) Patent No.: US 8,239,277 B2
(45) Date of Patent: Aug. 7, 2012

(54) METHOD, MEDIUM, AND SYSTEM TO MONITOR SHOPPERS IN A RETAIL OR COMMERCIAL ESTABLISHMENT

(75) Inventors: Morris Lee, Palm Harbor, FL (US); Arun Ramaswamy, Tampa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 519 days.

(21) Appl. No.: 12/415,506

(22) Filed: Mar. 31, 2009

(65) Prior Publication Data

US 2010/0250305 A1 Sep. 30, 2010

(51) Int. Cl.
*G06Q 30/00* (2012.01)
(52) U.S. Cl. ........... 705/26.1; 340/539.13; 340/568.5
(58) Field of Classification Search ............ 705/7, 26.1, 705/27.1; 701/205, 224; 235/376; 340/539.13, 340/568.5, 572.1–572.9, 10.1–10.6
See application file for complete search history.

(56) References Cited

U.S. PATENT DOCUMENTS

| | | | |
|---|---|---|---|
| 4,373,133 A | 2/1983 | Clyne et al. | |
| 4,644,509 A | 2/1987 | Kiewit et al. | |
| 4,779,198 A | 10/1988 | Lurie | |
| 4,930,011 A | 5/1990 | Kiewit | |
| 4,955,000 A | 9/1990 | Nastrom | |
| 4,973,952 A | 11/1990 | Malec et al. | |
| 4,990,892 A | 2/1991 | Guest et al. | |
| 5,014,206 A | 5/1991 | Scribner et al. | |
| 5,119,104 A | 6/1992 | Heller | |
| 5,146,231 A | 9/1992 | Ghaem et al. | |
| 5,287,266 A * | 2/1994 | Malec et al. | 705/323 |
| 5,294,781 A | 3/1994 | Takahashi et al. | |
| 5,321,396 A | 6/1994 | Lamming et al. | |
| 5,369,571 A | 11/1994 | Metts | |
| 5,387,993 A | 2/1995 | Heller et al. | |
| 5,465,115 A | 11/1995 | Conrad et al. | |
| 5,485,347 A | 1/1996 | Miura | |
| 5,541,835 A | 7/1996 | Dextraze et al. | |
| 5,559,496 A | 9/1996 | Dubats | |
| 5,583,776 A | 12/1996 | Levi et al. | |

(Continued)

FOREIGN PATENT DOCUMENTS

CA 251921 10/2004

(Continued)

OTHER PUBLICATIONS

Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).*

(Continued)

*Primary Examiner* — Matthew Zimmerman
(74) *Attorney, Agent, or Firm* — Hanley, Flight and Zimmerman, LLC

(57) ABSTRACT

Methods and apparatus to monitor shoppers in a retail environment are disclosed herein. In a disclosed example method involves collecting location information indicative of a measured path of travel of a person through a monitored environment. The example method also involves collecting person detection event information associated with a plurality of zones in the monitored environment. The person detection event information is indicative of detections of the person in each of the zones. In addition, the example method involves determining an adjusted path of travel of the person through the monitored environment based on the location information indicative of the measured path of travel and the person detection event information.

20 Claims, 12 Drawing Sheets

U.S. PATENT DOCUMENTS

| | | |
|---|---|---|
| 5,633,946 A | 5/1997 | Lachinski et al. |
| 5,640,002 A | 6/1997 | Ruppert et al. |
| 5,640,144 A | 6/1997 | Russo et al. |
| 5,692,215 A | 11/1997 | Kutzik et al. |
| 5,712,830 A | 1/1998 | Ross et al. |
| 5,712,985 A | 1/1998 | Lee et al. |
| 5,717,923 A | 2/1998 | Dedrick |
| 5,764,283 A | 6/1998 | Pingali et al. |
| 5,774,876 A | 6/1998 | Woolley et al. |
| 5,815,114 A | 9/1998 | Speasl et al. |
| 5,920,261 A | 7/1999 | Hughes et al. |
| 5,923,252 A | 7/1999 | Sizer et al. |
| 5,969,755 A | 10/1999 | Courtney |
| 5,973,732 A | 10/1999 | Guthrie |
| 6,002,918 A | 12/1999 | Heiman et al. |
| 6,054,950 A | 4/2000 | Fontana |
| 6,091,956 A | 7/2000 | Hollenberg |
| 6,098,048 A | 8/2000 | Dashefsky et al. |
| 6,216,119 B1 | 4/2001 | Jannarone |
| 6,252,522 B1 | 6/2001 | Hampton et al. |
| 6,259,991 B1 | 7/2001 | Nysen |
| 6,323,807 B1 | 11/2001 | Golding et al. |
| 6,327,573 B1 | 12/2001 | Walker et al. |
| 6,386,450 B1 | 5/2002 | Ogasawara |
| 6,396,413 B2 | 5/2002 | Hines et al. |
| 6,424,264 B1 | 7/2002 | Giraldin et al. |
| 6,430,498 B1 | 8/2002 | Maruyama et al. |
| 6,433,689 B1 | 8/2002 | Hovind et al. |
| 6,470,264 B2 | 10/2002 | Bide |
| 6,493,649 B1 | 12/2002 | Jones et al. |
| 6,563,423 B2 | 5/2003 | Smith |
| 6,577,238 B1 | 6/2003 | Whitesmith et al. |
| 6,587,835 B1 | 7/2003 | Treyz et al. |
| 6,647,269 B2 | 11/2003 | Hendrey et al. |
| 6,654,800 B1 | 11/2003 | Rieger, III |
| 6,657,543 B1 | 12/2003 | Chung |
| 6,697,104 B1 | 2/2004 | Yakobi et al. |
| 6,697,628 B1 | 2/2004 | Green et al. |
| 6,748,317 B2 | 6/2004 | Maruyama et al. |
| 6,837,427 B2 | 1/2005 | Overhultz et al. |
| 6,848,542 B2 | 2/2005 | Gailey et al. |
| 6,898,434 B2 | 5/2005 | Pradhan et al. |
| 6,911,908 B1 | 6/2005 | Beart |
| 6,912,507 B1 | 6/2005 | Phillips et al. |
| 6,919,803 B2 | 7/2005 | Breed |
| 6,928,343 B2 | 8/2005 | Cato |
| 6,940,403 B2 | 9/2005 | Kail, IV |
| 6,951,305 B2 | 10/2005 | Overhultz et al. |
| 6,970,131 B2 | 11/2005 | Percy et al. |
| 6,992,582 B2 | 1/2006 | Hill et al. |
| 7,006,982 B2* | 2/2006 | Sorensen ...................... 705/7.29 |
| 7,021,535 B2 | 4/2006 | Overhultz et al. |
| 7,038,619 B2 | 5/2006 | Percy et al. |
| 7,046,162 B2 | 5/2006 | Dunstan |
| 7,069,238 B2 | 6/2006 | I'Anson et al. |
| 7,076,441 B2 | 7/2006 | Hind et al. |
| 7,080,061 B2 | 7/2006 | Kabala |
| 7,099,676 B2 | 8/2006 | Law et al. |
| 7,148,803 B2 | 12/2006 | Bandy et al. |
| 7,171,331 B2 | 1/2007 | Vock et al. |
| 7,183,910 B2* | 2/2007 | Alvarez et al. ........... 340/539.13 |
| 7,206,514 B1 | 4/2007 | Compton |
| 7,227,498 B2 | 6/2007 | Soliman |
| 7,295,108 B2 | 11/2007 | Corrado et al. |
| 7,319,479 B1 | 1/2008 | Crabtree et al. |
| 7,386,237 B1 | 6/2008 | Compton |
| 7,415,510 B1 | 8/2008 | Kramerich et al. |
| 7,420,464 B2 | 9/2008 | Fitzgerald et al. |
| 7,448,548 B1 | 11/2008 | Compton |
| 7,460,827 B2 | 12/2008 | Schuster et al. |
| 7,463,143 B2 | 12/2008 | Forr et al. |
| 7,471,987 B2 | 12/2008 | Crystal et al. |
| 7,483,975 B2 | 1/2009 | Kolessar et al. |
| 7,602,339 B2 | 10/2009 | Fullerton et al. |
| 7,701,347 B2 | 4/2010 | Richards |
| 7,739,705 B2* | 6/2010 | Lee et al. ........................ 725/10 |
| 7,843,379 B2 | 11/2010 | Menzer et al. |
| 7,880,608 B2 | 2/2011 | Richards et al. |
| 2002/0002504 A1 | 1/2002 | Engel et al. |
| 2003/0055707 A1 | 3/2003 | Busche et al. |
| 2003/0097302 A1 | 5/2003 | Overhultz et al. |
| 2003/0122708 A1 | 7/2003 | Percy et al. |
| 2003/0146871 A1 | 8/2003 | Karr et al. |
| 2003/0171833 A1 | 9/2003 | Crystal et al. |
| 2003/0222819 A1 | 12/2003 | Karr et al. |
| 2003/0222820 A1 | 12/2003 | Karr et al. |
| 2004/0027271 A1 | 2/2004 | Schuster et al. |
| 2004/0039855 A1 | 2/2004 | Bohrer et al. |
| 2004/0072577 A1 | 4/2004 | Myllymaki et al. |
| 2004/0198386 A1 | 10/2004 | Dupray |
| 2004/0224703 A1 | 11/2004 | Takaki et al. |
| 2004/0266457 A1 | 12/2004 | Dupray |
| 2005/0006466 A1 | 1/2005 | Overhultz et al. |
| 2005/0035857 A1 | 2/2005 | Zhang et al. |
| 2005/0141345 A1 | 6/2005 | Holm et al. |
| 2005/0200476 A1 | 9/2005 | Forr et al. |
| 2005/0201826 A1 | 9/2005 | Zhang et al. |
| 2005/0203798 A1 | 9/2005 | Jensen et al. |
| 2005/0234774 A1 | 10/2005 | Dupree |
| 2005/0243784 A1 | 11/2005 | Fitzgerald et al. |
| 2006/0053110 A1 | 3/2006 | McDonald et al. |
| 2006/0106674 A1 | 5/2006 | Muller |
| 2006/0109125 A1 | 5/2006 | Overhultz et al. |
| 2006/0111961 A1 | 5/2006 | McQuivey |
| 2006/0186201 A1* | 8/2006 | Hart ............................. 235/385 |
| 2007/0018811 A1* | 1/2007 | Gollu ...................... 340/539.13 |
| 2008/0074264 A1* | 3/2008 | Sharpe et al. .............. 340/572.1 |
| 2008/0140479 A1 | 6/2008 | Mello et al. |
| 2008/0147461 A1 | 6/2008 | Lee et al. |
| 2010/0199296 A1* | 8/2010 | Lee et al. ........................ 725/14 |

FOREIGN PATENT DOCUMENTS

| | | |
|---|---|---|
| WO | 99/55057 | 10/1999 |
| WO | 03/087871 | 10/2003 |
| WO | 2004/051303 | 6/2004 |
| WO | 2004/051304 | 6/2004 |
| WO | 2004/086337 | 10/2004 |
| WO | 2006/037014 | 4/2006 |
| WO | 2006/052386 | 5/2006 |
| WO | 2006/055634 | 5/2006 |
| WO | 2006/055667 | 5/2006 |

OTHER PUBLICATIONS

Bahl et al., "Enhancements to the RADAR User Location and Tracking System," Technical Report MSR-TR-2000-12: Microsoft Research, http://research.microsoft.com/~padmanab/papers/msr-tr-2000-12.pdf, Feb. 2000 (13 Pages).

Falk et al., "Pirates: Proximity-Triggered Interaction in a Multi-Player Game," http://www.playresearch.com/, 2001(2 Pages).

Rekimoto et al., "CyberCode: Designing Augmented Reality Environments with Visual Tags," http://www.csl.sony.co.jp/person/rekimoto/papers/dare2000.pdf, 2000 (10 Pages).

Laird et al., "Early User Appraisal of the MDARS Interior Robot," http://www.nosc.mil/robots/pubs/ans99_mdars_eua.pdf, Apr. 1999 (22 Pages).

Wilson et al, "The Narrator: A daily Activity Summarizer using Simple Sensors in an Instrumented Environment," www.cs.cmu.edu/~dwilson/papers/wilsonUBICOMP2003DEMO.pdf, 2003 (4 Pages).

Shen et al., "RemoteEyes: A Remote Low-Cost position Sensing Infrastructure for Ubiquitous Computing," http://hct.ece.ubc.ca/publications/pdf/shen-etal-inss2004.pdf, 2004 (5 Pages).

Everett et al., Multiple Resource Host Architechture (MRHA) for the Mobile Detection Assessment Response System (MDARS), SPAWAR Systems Center, San Diego, Sep. 2000 (119 pages).

TRAF-SYS People Counting Systems, "Thermal Sensor Installation (wireless)," revised Dec. 15, 2008, retrieved from http://www.trafsys.com/media/6980/thermal_sensor(wireless)_installation.pdf, 24 pages.

Bernstein et al., "An Introduction to Map Matching for Personal Navigation Assistants," New Jersey TIDE Center, New Jersey Institute of Technology, Aug. 1996 (17 pages).

McCarthy et al., "RF Free Ultrasonic Positioning," Department of Computer Science, University of Bristol, U.K., 2003 (7 pages).

McCarthy et al., "RF Free Ultrasonic Positioning (Presentation)," 7th International Symposiom on Wearable Computers, Oct. 2003 (12 pages).

Gentile et al., "Robust Location using System Dynamics and Motion Constraints," National Institute of Standards and Technology, Wireless Communication Technologies Group, Jun. 24, 2004 (5 pages).

Cricket Project, "Cricket v2 User Manual," MIT Computer Science and Artificial Intelligence Lab, Cambridge, U.S.A., Jan. 2005 (57 pages).

Holm, Sverre, "Technology Presentation," [online]. Sonitor Technologies, May 26, 2004 [retrieved on Oct. 13, 2004]. Retrieved from the Internet: <URL: www.sonitor.com/news/article.asp?id=62> (16 pages).

"The Nibble Location System," [online]. UCLA, May 21, 2001 [retrieved on Nov. 2, 2004]. Retrieved from the Internet: <URL: http://mmsl.cs.ucla.edu/nibble/>. (13 pages).

"New Sonitor Patent Combines Ultrasound and RFID," [online]. Sonitor Technologies, Feb. 17, 2005 [retrieved on Jun. 13, 2005]. Retrieved from the Internet: <URL: http://sonitor.com/news/article.asp?id=73>. (1 page).

"NIST Location System," [online]. Wireless Communication Technologies Group, National Institute of Standards and Technology, Mar. 12, 2004 [retrieved in Nov. 1, 2004]. Retrieved from the Internet: <URL: www.antd.nist.gov>. (2 pages).

Ferguson, Michael. "XTension Tech Notes," [online]. Sand Hill Engineering Inc., Dec. 10, 1998 [retrieved in Jan. 12, 2004]. Retrieved from the Internet: <URL: http://www.shed.com/articles/TN.proximity.html >. (9 pages).

"FM Wireless Microphone Module Kits," [online]. Horizon Industries, 2004 [retrieved on Sep. 30, 2004]. Retrieved from the Internet: <URL: www.horizonindustries.com/fm.htm>. (1 page).

"Arkon Sound Feeder II FM Transmitter," [online]. Yahoo Shopping, 2002 [retrieved on Sep. 29, 2004]. Retrieved from the Internet: <URL: http://store.yahoo.com/semsons-inc/arsoundfeedii.html>. (2 pages).

"Dust Networks—SmartMesh," [online]. Dust Networks Inc., 2002 [retrieved on Sep. 29, 2004]. Retrieved from the Internet: <URL: www.dustnetworks.com>. (2 pages).

Kanellos, Michael. "Dust Makes Mesh of Wireless Sensors," [online]. CNET News.com, Sep. 20, 2004 [retrieved on Sep. 29, 2004]. Retrieved from the Internet: <URL: http://www.news.com/Dust-makes-mesh-of-wireless-sensors/2100-1008_3-5374971.html?tag=item>. (2 pages).

"UHF Radio Data Logging System—GenII Data Logger," [online]. Amplicon, 2004 [retrieved on Sep. 29, 2004]. Retrieved from the Internet: <URL: www.amplicon.co.uk/dr-prod3.cfm/subsecid/10037/secid/1/groupid/11809.htm>. (3 pages).

"Eltek GenII Radio Data Logging System," [online]. Eltek Ltd., 2004 [retrieved on Sep. 29, 2004]. Retrieved from the Internet: <URL: www.elteckdataloggers.co.uk>. (4 pages).

"Discovery Spy Motion Tracking System," [online]. Discovery Communications Inc., 2004 [retrieved on Sep. 14, 2004]. Retrieved from the Internet: <URL: http://shopping.discovery.com/stores/servlet/ProductDisplay?catalogId=10000&storeId=10000&lanlan=-1&productId=53867&partnumber=689638>. (3 pages).

Schuman, Evan. "Smarter Smart Cart?" [online]. Storefront Backtalk, Feb. 16, 2005 [retrieved on Nov. 20, 2006]. Retrieved from the Internet: <URL: www.storefrontbacktalk.com>. (5 pages).

"University Library Navigation Enabled by Ekahau," [online]. Directions Magazine, Jun. 12, 2003 [Aug. 3, 2007]. Retrieved from the Internet: <URL: http://www/directionsmag.com/press.releases/index.php?duty=Show&id=7276&trv=1>. (3 pages).

Yeung, K.L., & Yum, T.-S.P. "A Comparative Study on Location Tracking Strategies in Cellular Mobile Radio Systems," Global Telecommunications Conference, 1995. Globecom '95, IEEE, Nov. 14-26, 1995 (pp. 22-28 vol. 1).

Handy et al., "Lessons Learned from Developing a Bluetooth Multiplayer-Game," 2nd International Conference on Pervasive Computing, Workshop on Gaming, [retrieved from internet, http://www.ipsi.fraunhofer.de/ambiente/pervasivegaming/papers/Handy_Pervasive2004.pdf] (pp. 7).

Battiti, Roberto, et al. "Location-Aware Computing: a Neutral Network Model for Determining Location in Wireless LANS" University of Trento: Department of Information and Communication Technology, Technical Report #DIT-02-0083, Feb. 2002 (pp. 1-16).

Azondekon et al., "Service Selection in Networks Based on Proximity Confirmation Using Infrared", http://www.scs.carleton.ca/~barbeau/Publications/2002/azondekon.pdf, International Conference on Telecommunications (ICT) Beijing, 2002 (5 Pages).

Bahl et al., "A Software System for Locating Mobile Users: Design, Evaluation, and Lessons", Technical Report MSRTR-2000-12 Microsoft Research, [retrieved from internet, http://research.microsoft.com/~bahl/Papers/Pdf/radar.pdf],Feb. 2000 (13 Pages).

Wagner, David P. Battelle. Report: Lexington Area Travel Data Collection Test; GPS for Personal Travel Surveys. Final Report for Office of Highway Information Management, Office of Technology Application, and Federal Highway Administration, Sep. 1997, (92 pages). Technology Application, and Federal Highway Administration, Sep. 1997, (92 pages).

"Out of the Lab and into the Field: A Report on the Extended Field Test of Arbitron's Portable People Meter in Manchester, England,"XP-002978594, Arbitron, 2000, 24 Pages.

"Ekahau Site Survey—Ekahau. Features," [online]. Ekahau, Inc., [retrieved on Mar. 12, 2004]. Retrieved from the Internet: <URL: http://www.ekahau.com/products/sitesurvey/ess20_features.html>. (3 pages).

"Ekahau Positioning Engine 2.1—Ekahau," [online]. Ekahau, Inc., [retrieved on Mar. 12, 2004]. Retrieved from the Internet: <URL: http://www.ekahau.com/products/positioningengine/>. (3 pages).

"Ekahau Positioning Engine 2.1 specifications—Ekahau," [online]. Ekahau, Inc., [retrieved on Mar. 12, 2004]. Retrieved from the Internet: <URL: http://www.ekahau.com/products/positioningengine/epe20_specifications.html>. (2 pages).

"Ekahau Positioning Engine 2.1 requirements—Ekahau," [online]. Ekahau, Inc., [retrieved on Mar. 12, 2004]. Retrieved from the Internet: <URL: http://www.ekahau.com/products/positioningengine/epe20_requirements.html>. (2 pages).

"Ekahau Positioning Engine 2.1 Case Studies—Ekahau," [online]. Ekahau, Inc., [retrieved on Mar. 12, 2004]. Retrieved from the Internet: <URL: http://www.ekahau.com/products/positioningengine/epe20_casestudies.html>. (2 pages).

"Ekahau Site Survey—Ekahau: Site Survey™ 2.0," [online]. Ekahau, Inc., [retrieved on Mar. 12, 2004]. Retrieved from the Internet: <URL: http://www.ekahau.com/products/sitesurvey/>. (3 pages).

"Ekahau Site Survey—Ekahau. Quick-FAQ," [online]. Ekahau, Inc., [retrieved on Mar. 12, 2004]. Retrieved from the Internet: <URL: http://www.ekahau.com/products/sitesurvey/ess20_faq.html>. (4 pages).

"Ekahau Positioning Engine 2.1 Features—Ekahau: Positioning in 802.11b Networks," [online]. Ekahau, Inc., [retrieved on Mar. 12, 2004]. Retrieved from the Internet: <URL: http://www.ekahau.com/products/positioningengine/epe20_features.html>. (2 pages).

"Ekahau Positioning Engine 2.1 Data Sheet". Ekahau, Inc., Nov. 24, 2003 (2 pages).

"DRM-III OEM Circuit Module," [online]. Point Research Corporation, Apr. 1, 2004, [retrieved on Jul. 2, 2010]. Retrieved from the Internet: <URL: http://web.archive.org/web/20040401214737/http://pointresearch.com/drm3_module.htm>. (3 pages).

Gaynor et al., "RF Tracking," Boston University (7 pages).

Trolley Scan (PTY) Ltd, "Trolleyponder®/ EcoTag®: Small and medium Production Systems", http://trolley.co.za/isosys.html (5 Pages).

RFID Journal, "New Energy-Efficient RFID Tag", http://wwwrfidjournal.com/article/articleprint/718/-1/1, 2002 (2 Pages).

Clark, Julie. "Shopping with Detectives: Customer Tracking Takes the Mystery out of Store Design (The Digital Store)," Display and Design Ideas, May 2002 (v14, n5, p. 48, 2 pages).

Popular Electronics Detector Schematic, "Popular Electronics Heterodyne Detector," Sep. 10, 2000, retrieved from http://www.njsas.org/projects/bat_detector/populel_sch.html on Jan. 26, 2012, 3 pages.

Ultrasound Detector D 100, User Manuel, 2 pages.

Goffin, Vincent, "The Transtronics SK-207 Heterodyne Detector," Heterodyne Division Bat Detector, Jul. 16, 2000 [retrieved from http://www.njsas.org/projects/bat_detector/01/sk207.html] on Jan. 26, 2012, 2 pages.

Goliath Solutions How it Works, retrieved from http://www.goliathsolutions.com/html/how_it_works/how_it_works.htm, on or before Jul. 14, 2006, 3 pages.

* cited by examiner

TRAVEL PATH TABLE

ZONE BOUNDARIES TABLE

METHOD, MEDIUM, AND SYSTEM TO MONITOR SHOPPERS IN A RETAIL OR COMMERCIAL ESTABLISHMENT

FIELD OF THE DISCLOSURE

The present disclosure relates generally to consumer monitoring and, more particularly, to methods and apparatus to monitor shoppers in a retail environment.

BACKGROUND

Retail establishments and product manufacturers are often interested in the shopping activities, behaviors, and/or habits of people in a retail environment. Consumer activity related to shopping can be used to correlate product sales with particular shopping behaviors and/or to improve placements of products, advertisements, and/or other product-related information in a retail environment. Known techniques for monitoring consumer activities in retail establishments include conducting surveys, counting patrons, and/or conducting visual inspections of shoppers or patrons in the retail establishments.

Acquiring information related to shopping activities, behaviors, and/or habits of people in a retail environment enables retail establishments to arrange their store and product layouts in a manner that is most conducive to maximizing sales of such products by positively influencing shoppers. Acquiring such information also enables product manufacturers to design product packaging that influences shoppers exhibiting certain behaviors or shopping patterns and/or to design different product packaging to target different shopper behaviors, patterns, or habits associated with different geographic areas. Advertisers can also benefit from metering shopping activities, behaviors, and/or habits of people in a retail environment by using such information to create more effective advertisements and/or position advertisements in more opportune locations within different retail establishments. In addition, advertisers can assess which advertisements are more effective than others.

DETAILED DESCRIPTION

Figure 1:
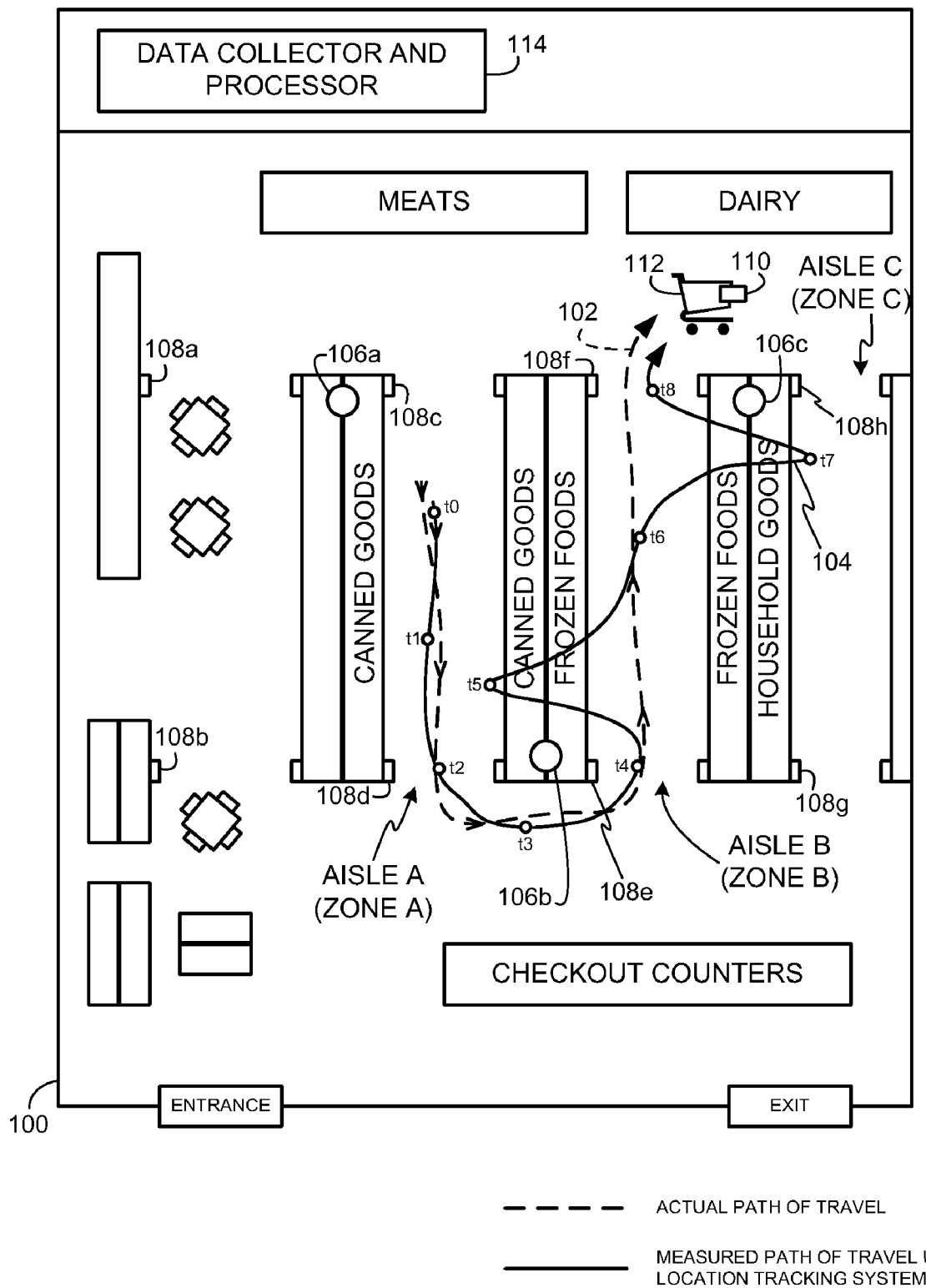
FIG. 1 illustrates a plan view of an example retail establishment having actual and measured shopper paths of travel overlaid thereon.

Although the following discloses example methods and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, or in any combination of hardware and software. Accordingly, while the following describes example methods, systems, and apparatus, persons having ordinary skill in the art will readily appreciate that the examples provided are not the only way to implement such methods, systems, and apparatus.

The example methods and apparatus described herein may be implemented by a consumer metering entity, by a retail business, or by any other entity interested in collecting and/or analyzing information to monitor persons in a monitored environment. For example, the example methods and apparatus may be used to monitor shopper traffic. The example methods and apparatus can be used to determine shopper locations associated with shopper traffic and the times at which locations of those shoppers are detected. In addition, paths of travel of different shoppers can be determined. The example methods and apparatus may be used to help marketing and media professionals better understand the amount of shopper traffic and shopper traffic trends in retail establishments. Such information may be used to determine how to reach and influence shoppers that buy goods in retail establishments. For example, by monitoring in-store shopper quantities and traffic, the example methods and apparatus described herein can be used to determine when shopper traffic is heaviest and lightest and to determine locations most frequented in a retail establishment.

In some example implementations, the example methods and apparatus can be implemented using less expensive means than other known path of travel monitoring systems yet achieving comparably similar accuracy as those systems. In general, an example implementation involves using people detection devices located throughout a retail establishment in connection with a location tracking system in the retail establishment. The people detection devices collect shopper detection event data (or person detection event data) in different aisles or zones of the retail establishment indicative of when shoppers move proximate to the people detection devices, while tracking beacons (access points, chirp receivers, signal receivers, etc.) associated with the location tracking system are located throughout the store to collect measured path of travel information associated with respective shoppers. The shopper detection event data collected using the people detection devices is used in connection with the measured path of travel information to increase the accuracy of the path of travel information by adjusting or correcting erroneous or inaccurate location data in the measured path of travel information. In some example implementations, the path of travel information can then be used to identify products, advertisements, and/or other media or information to which shoppers were exposed along those path(s).

In general, location tracking systems are relatively more expensive than people detection devices. Thus, by using people detection devices in connection with a location tracking system, the location tracking system can be installed using less tracking beacons located throughout a store than would otherwise be needed. Although, the location tracking system would then generate less granular path of travel information than could otherwise be achieved with more tracking beacons, the cost of the location tracking system can be substantially reduced. To subsequently increase the accuracy of the measured path of travel information, the shopper detection event data from the people detection devices is used to confirm the aisle or zone of a retail establishment in which a shopper was located whenever a suspect location datum generated by the location tracking system is detected.

Turning to FIG. 1, a plan view of an example retail establishment 100 is shown having an actual shopper path of travel 102 and a measured shopper path of travel 104 overlaid thereon. In the illustrated example, the retail establishment 100 is a grocery store. However, the example methods and apparatus described herein can be used to monitor shoppers' paths of travel in other monitored environments such as other types of retail establishments (e.g., department stores, clothing stores, specialty stores, hardware stores, etc.) or commercial establishments (e.g., entertainment venues, amusement parks, sports arenas/stadiums, etc.). The retail establishment 100 is shown as having aisles A-C representative of different zones of the retail establishment. A zone is an area of a monitored environment accessible by people who are to be monitored to generate traffic counts and paths of travel of those people. In the illustrated example, the boundaries of a zone may relate to product layout throughout the retail establishment, furniture layout, and/or other boundary-creating features (e.g., an outdoor garden and lawn area). In some example implementations, zones are created based on the types of products that are sold in particular areas of a retail establishment.

The actual shopper path of travel 102 indicates the actual path traveled by a shopper through aisles 1 and 2 of the retail establishment 100, and the measured shopper path of travel 104 indicates the path of travel data collected by a location tracking system having location detection devices 106a-c located throughout the retail establishment 100. In the illustrated example, the location detection devices 106a-c are implemented using wireless radio frequency (RF) communication units. In the illustrated example, the data collected by the location tracking system indicates that the shopper exited aisle A and entered into aisle B. However, while in aisle B the shopper was measured as having detoured momentarily back into aisle A and also subsequently detoured momentarily into aisle C. Although these erroneous excursions or deviations could be remedied by increasing the number of tracking beacons throughout the retail establishment 100, the example methods and apparatus described herein can be used to detect and correct or adjust the erroneous excursions or deviations based on shopper detection event data generated using people detectors 108a-h located throughout the retail establishment 100. Using shopper detection event data generated using the people detectors 108a-h facilitates generating relatively more accurate path of travel information to more accurately represent the actual shopper path of travel 102. In the illustrated example, the people detectors 108a-h are located at predetermined entrances and exits of respective zones (e.g., the aisles A-C) and are configured to detect when shoppers pass through the entrances/exits. In some example implementations, the people detectors 108a-h can also be implemented to detect the direction in which a shopper moves to indicate whether the shopper has entered or exited a zone when the shopper is detected.

Figure 2:
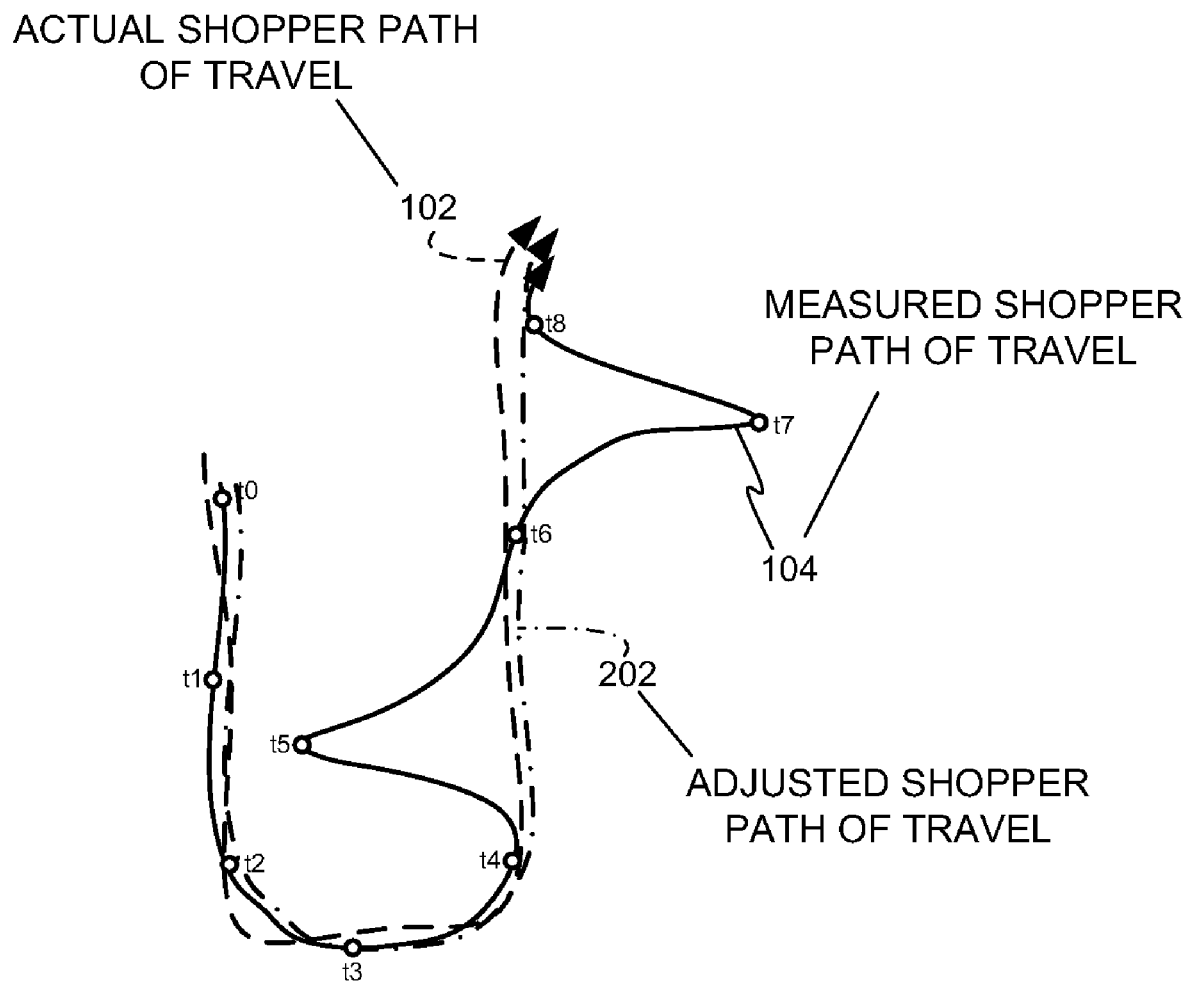
FIG. 2 depicts an actual shopper path of travel shown in association with a measured shopper path of travel and an adjusted shopper path of travel.

Turning briefly to FIG. 2, an adjusted (or processed) path of travel 202 generated based on the measured path of travel 104 and shopper detection event data is shown relative to the actual path of travel 102 and the measured path of travel 104. As shown, the actual shopper path of travel 102 is relatively more similar to the adjusted shopper path of travel 202 than to the measured shopper path of travel 104.

Returning to FIG. 1, to generate the measured shopper path of travel 104, a mobile tag 110 is provided for mounting on shopping carts such as the shopping cart 112. Additionally or alternatively, tags that are substantially similar or identical to the tag 110 can be mounted to shopping baskets or can be issued to shoppers when they enter the retail establishment 100 and worn or carried by those shoppers as they move through the retail establishment 100. In addition, the retail establishment 100 is provided with a data collector and processor 114 that is used to collect and process measured path of travel information. In some example implementations, the data collector and processor 114 can be communicatively coupled to a server at a data collection facility (not shown) via a telephone line, a broadband internet connection, a wireless cellular connection, and/or any other suitable communication interface. In such a configuration, the data collector and processor 114 can communicate measured path of travel information, shopper detection event data, and/or adjusted path of travel information to the data collection facility for subsequent analyses. In some example implementations, the data collector and processor 114 can collect and analyze the measured shopper path of travel 104 to generate the adjusted shopper path of travel 202, while in other example implementations, the data collector and processor 114 can communicate the measured shopper path of travel 104 along with shopper detection event data to the data collection facility, and the data collection facility can analyze the measured shopper path of travel 104 to generate the adjusted shopper path of travel 202.

Each mobile tag (e.g., the tag 110) is encoded with a unique tag identifier and periodically emits a chirp or any other type of signal carrying information or data representative of its unique tag identifier as it is moved through the retail establishment 100. The location detection devices 106a-c detect the chirps or signals from the mobile tags and communicate signal properties of the chirps and/or data embedded in the chirps to the data collector and processor 114. Thus, the data collector and processor 114 can use the signal properties and/or the chirp-embedded data to determine the different locations of the tag 110 and store the location information in association with the unique tag identifier of the tag 110 to represent the measured path of travel 104.

During an analysis and correction process, location data forming the measured shopper path of travel 104 and collected at times t0-t8 (FIGS. 1 and 2) is analyzed to determine whether any path segments of the measured path of travel 104 have suspect excursions, deviations, or movements between different zones. When such a suspect excursion, deviation, or movement is detected, the location data having the error or inaccuracy is changed, adjusted or otherwise corrected to provide a more accurate representation of the actual shopper path of travel 102. An example manner of detecting such suspect excursions, deviations, or movements involves identifying the times at which a shopper traversed a predetermined entrance and a predetermined exit of a zone (e.g., an aisle) and determining whether any location points temporally collected between the entrance and exit events indicate a location other than the zone that was entered or exited through the predetermined entrance and predetermined exit.

To detect an entrance/exit event to/from a zone, a match or substantial match is found between a timestamp of a shopper detection event and a timestamp of a collected location point along the measured path of travel 104. Referring to the location collection time t4 of FIG. 1, a substantial match within a threshold time or time difference between a timestamp of a shopper detection event generated using the people detector 108e and a timestamp of a location point collected using one or more of the location detection devices 106a-c at time t4 indicates that the shopper was in aisle B. A similar analysis for time t8 in connection with a shopper detection event generated using the people detector 108f also shows that the shopper was in aisle B at t8. The threshold time range or time difference defining when a substantial match between timestamps is confirmed can be selected based on experimental trials used to determine a maximum or typical temporal misalignment between the time the tag 110 emits a chirp for location detection purposes and the time that a people detector 108a-h detects the person associated with the tag 110.

To increase the probability of finding a match in timestamps between a particular collected location datum and a person detection event, a feedback technique can be implemented to increase the chirp rate (or signal emission rate) of the tag 110 when it approaches the locations of the people detectors 108a-h. In some example implementations, a feedback technique may involve providing the tag 110 with an infrared sensor and implementing the people detectors 108a-h using infrared transmitters and receivers. In such example implementations, the people detectors 108a-h are configured to generate a shopper detection event when a shopper breaks the infrared beam transmitted by the infrared transmitter toward the infrared receiver. To implement a feedback technique to increase the chirp rate (or signal emission rate) of the tag 110, when the tag 110 is in the vicinity of any of the people detectors 108a-h, it detects the infrared light emitted by the infrared transmitters of the people detectors 108a-h to which it is proximate. In particular, the tag 110 can be configured to increase its chirp rate (or signal emission rate) to emit chirps (or signals) more frequently when it detects infrared light from one (or more) of the people detectors 108a-h. In this manner, relatively more location data and corresponding timestamps can be generated for the tag 110 when the tag 110 is in the vicinity of the people detectors 108a-h. Having relatively more location data and corresponding timestamps when the tag 110 is near the people detectors 108a-h increases the probability of finding a match between a timestamp of a shopper detection event and a timestamp of a collected location datum to confirm that a shopper was in a particular zone (e.g., one of the aisles A-C) of the retail establishment 100.

In other example implementations, a feedback technique to increase the tag chirp rate may be implemented by providing the tag 110 with data reception capabilities in which the tag 110 can be instructed by, for example, the data collector and processor 114, to increase its chirp rate when the data collector and processor 114 determines that the tag 110 is near or proximate to any of the people detectors 108a-h. Alternatively, the data collector and processor 114 can transmit chirp triggers at a relatively higher rate than the rate at which the tag 110 normally emits chirps. In this manner, the chirp triggers can cause the tag 110 to emit chirps at higher rates. For example, with each chirp received by the location detection devices 106a-c during a normal chirp rate of the tag 110, the data collector and processor 114 can determine, in real-time or substantially real-time, a location of the tag 110. When the data collector and processor 114 determines that a location of the tag 110 is within a threshold distance of one of the people detectors 108a-h, the data collector and processor 114 can communicate via the location detection devices 106a-c, a higher chirp rate configuration instruction to configure the tag 110 to emit chirps at a higher rate or can emit several chirp trigger signals to the tag 110 at a high rate while the tag 110 is within the vicinity of any of the people detectors 108a-h.

To provide additional information associated with detections of shoppers as they walk by or move proximate to the people detectors 108a-h, the people detectors 108a-h can, in some example implementations, be provided with travel direction detectors to determine the direction in which shoppers are traveling when they move past or proximate to the people detectors 108a-h. In such a configuration, each person detection event entry can store a detected direction in association with a timestamp of when the shopper detection event occurred. The direction information can then be used to correct location data forming measured shopper paths of travel (e.g., the measured shopper path of travel 104) by using the direction information to determine whether a detected shopper was entering or exiting a particular zone.

Figure 3:
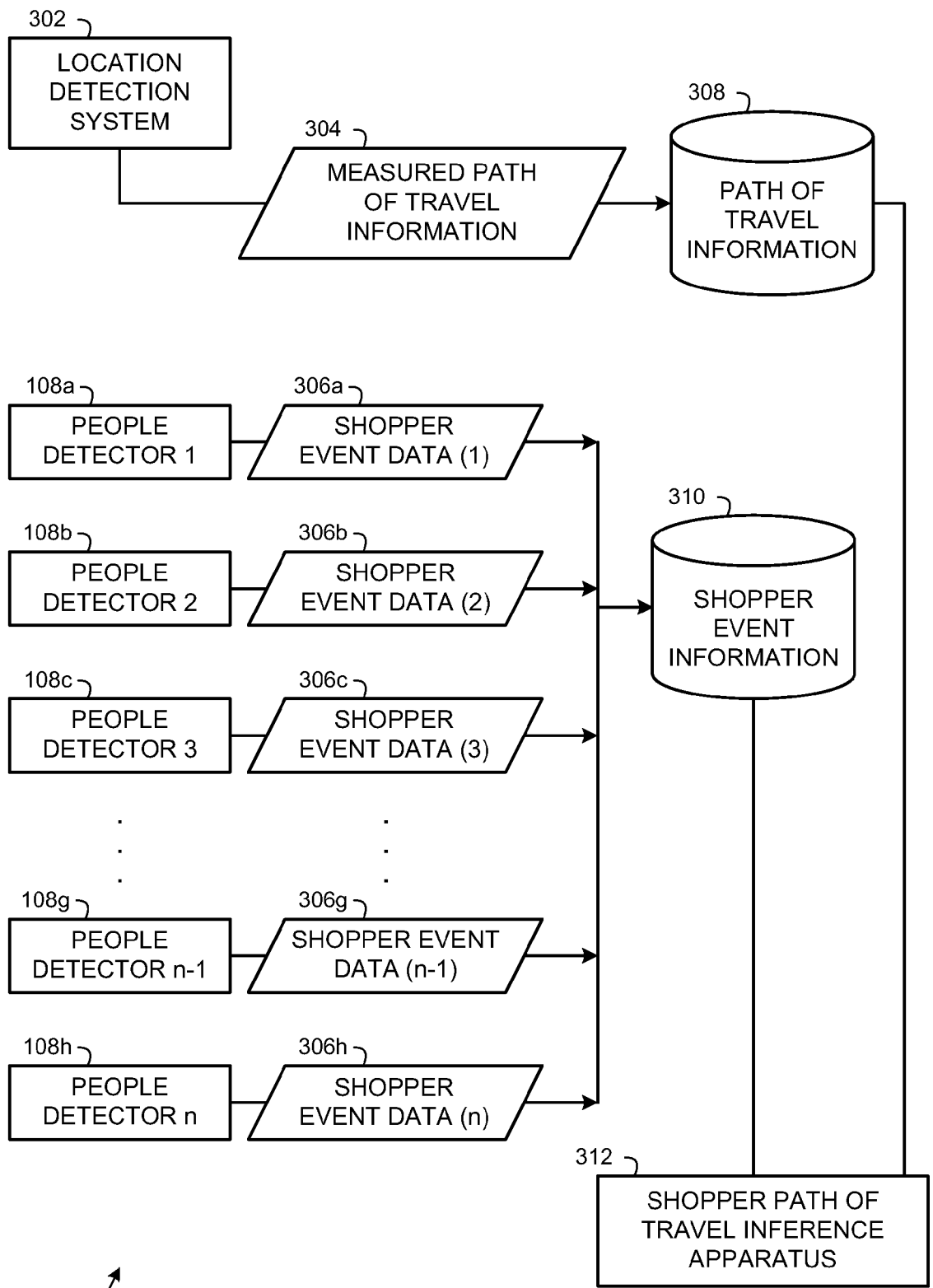
FIG. 3 depicts a system that can be installed in a retail establishment to generate path of travel information and analyze shopper activity in the retail establishment.

Turning to FIG. 3, an example system 300 can be installed in the retail establishment 100 of FIG. 1 to generate path of travel information and analyze shopper activity in the retail establishment 100. The example system 300 is shown in connection with a data flow that can be used to collect measured shopper path of travel information and shopper detection event data to generate more accurate shopper path of travel information. The example system 300 includes a location detection system 302 to generate measured path of travel information 304, which can be used to represent, for example, the measured shopper path of travel 104 of FIG. 1. The location detection system 302 can be implemented using the location detection devices 106a-c of FIG. 1 in combination with the data collector and processor 114. The example system 300 also includes the people detectors 108a-h of FIG. 1, each of which generates respective shopper detection event information 306a-h.

In the illustrated example, the example system 300 is provided with a path of travel information store 308 that is used to store the measured path of travel information 304 and a separate shopper event information store 310, which used to store the shopper detection event information 306a-h. The example system 300 is also provided with a shopper path of travel inference apparatus 312 to analyze the measured path of travel information 304 in connection with the shopper event information 306a-h to improve the accuracy of the measured path of travel information 304 by generating, for example, the adjusted shopper path of travel 202 shown in FIG. 2. The relatively more accurate adjusted shopper path of travel information reduces or eliminates the measured excursions or deviations into aisles A and C shown in FIG. 1 and provides a measured shopper path of travel that is relatively more representative of the actual shopper path of travel 102. An example apparatus that can be used to implement the shopper path of travel inference apparatus 312 is described below in connection with FIG. 9.

Figure 4:
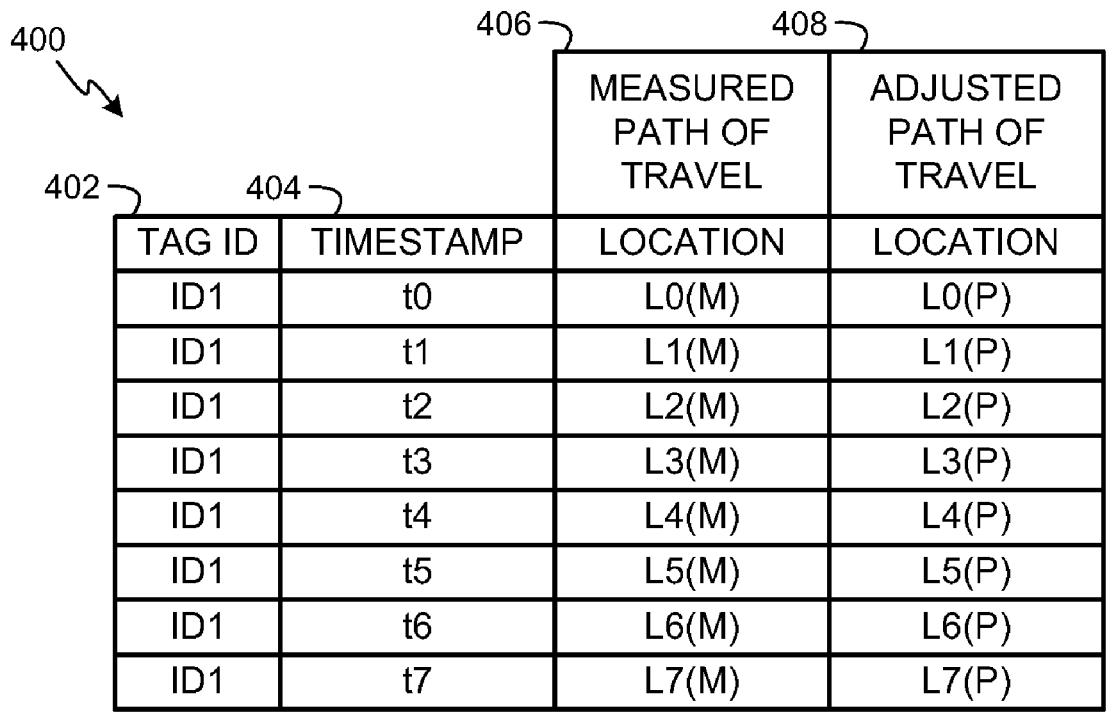
FIG. 4 depicts a data structure that can be used to store path of travel information associated with a shopper in a retail establishment.

FIG. 4 depicts a travel path data structure 400 that can be used to store path of travel information associated with a shopper in a retail establishment (e.g., the retail establishment 100 of FIG. 1). The travel path data structure 400 may be used to store the measured path of travel information 304 of FIG. 3 in the path of travel information store 308 of FIG. 3. In the illustrated example of FIG. 4, the travel path data structure 400 includes a tag identification column 402, a timestamp column 404, a measured path of travel column 406, and an adjusted path of travel column 408. The tag identification column 402 stores identifiers uniquely associated with different tags (e.g., the tag 110 of FIG. 1) in the retail establishment 100. The timestamp column 404 stores timestamps in association with each respectively collected location datum forming a respective path of travel. Each timestamp entry indicates the time at which one of the location detection devices 106a-c detected a tag-emitted chirp that was used to determine a respective location datum corresponding to that timestamp entry and stored in the measured path of travel column 406. In the illustrated example, the adjusted path of travel column 408 stores location data modified to be more representative of the actual path of travel of a shopper. In the illustrated example, the originally collected measured path of travel data is preserved in the measured path of travel column 406. However, in other example implementations, modifications to the measured location datum can be made to the measured path of travel data without storing separate processed path of travel data.

Figure 5:
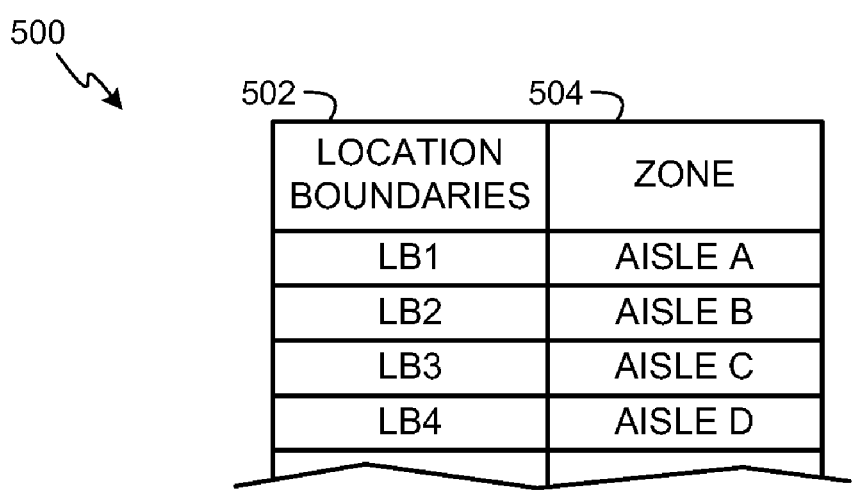
FIG. 5 depicts a data structure that can be used to associate zones in a retail establishment with respective location boundaries in the retail establishment.

FIG. 5 depicts a zone boundary data structure 500 that can be used to associate zones (e.g., the aisles A-C of FIG. 1) in the retail establishment 100 of FIG. 1 with respective location boundaries in the retail establishment 100. The zone boundary data structure 500 includes a location boundaries column 502 and a zone column 504. The location boundaries column 502 stores location boundary entries, each of which defines a perimeter demarking a corresponding zone identified by a zone identifier in the zone column 504. In the illustrated examples described herein, the zone boundary data structure 500 can be used to determine when a measured shopper path of travel (e.g., the measured shopper path of travel 104 (FIGS. 1 and 2)) indicates that a corresponding shopper moved between different zones (e.g., different ones of the aisles A-C of FIG. 1). For example, if the location entry L4(M) in the measured path of travel column 406 of FIG. 4 indicates that a shopper was in aisle B based on the location boundary definition LB2 in the location boundaries column 502 of FIG. 5 and the location entry L5(M) in the measured path of travel column 406 indicates that the shopper was in aisle A based on the location boundary definition LB1 in the location boundaries column 502, this inter-zone transition can be flagged as requiring further analysis to confirm and/or correct its accuracy or validity. For example, the inter-zone transition can be analyzed by using shopper detection event data collected using the people detectors 108d and 108e to determine which of the aisles A and B the shopper was last detected as exiting and/or entering.

Figure 6:
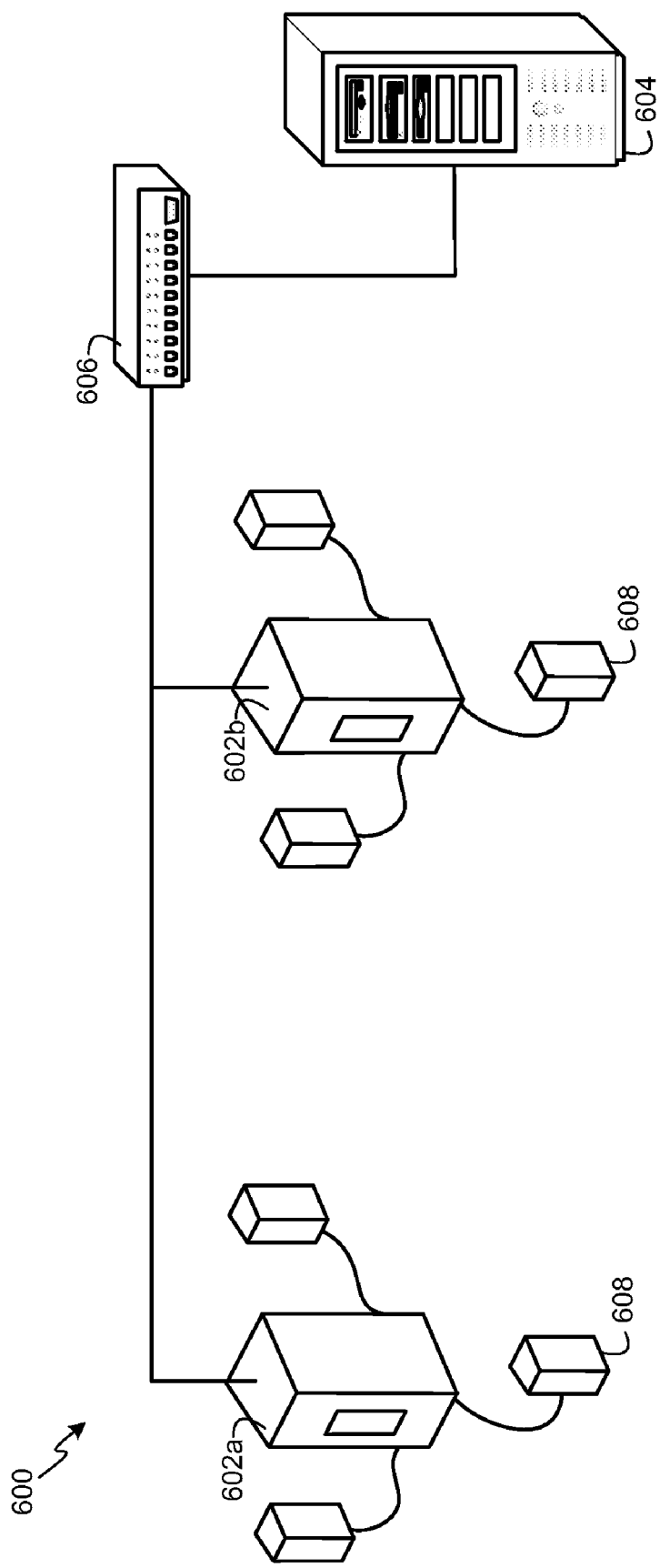
FIG. 6 is an example location monitoring system that may be used to implement a location detection system to track shoppers' paths of travel in a retail establishment.

FIG. 6 is an example location monitoring system 600 that may be used to implement the location detection system including the location detection devices 106a-c located throughout the retail establishment 100 of FIG. 1. The monitoring system 600 may be configured to work with the example tag 110 (FIG. 1) to generate location information indicative of paths of travel associated with shoppers' movements through the retail establishment 100 of FIG. 1. The monitoring system 600 or another processing system (e.g., the data collector and processor 114 or a server at a central facility) may then use the location information to determine the path(s) walked by shoppers.

In the illustrated example of FIG. 6, the monitoring system 600 includes two base units 602a and 602b communicatively coupled to a data interface unit 604 via a network hub 606. The base units 602a-b are communicatively coupled to a plurality of satellite units 608, which may be used to implement the location detection devices 106a-c of FIG. 1. The monitoring system 600 may be implemented using ultrasound technologies, any other audio or acoustic technology, or any suitable RF technology. In the illustrated examples described herein, the tag 110 is provided with a signal emitter to emit chirps, and the location detection devices 106a-c are configured to receive chirps from the tag 110. In such example implementations, the satellite units 608 of FIG. 6 can be provided with microphones or transducers that enable the units 602a-b and 608 to detect tag ID signals emitted by the tag 110. In alternative example implementations that may be used to implement the methods and apparatus described herein, the tag 110 may be provided with a sensor and the base sensor units 602a-b and the satellites sensor units 608 may include audio emitters or RF transmitters to emit or transmit chirps detectable by the tag 110. Each of the base units 602a-b may have a plurality of data acquisition or transmission channels. Each of the base sensor units 602a-b may be coupled to data acquisition channel zero, and each of the satellite units 608 may be coupled to a respective subsequently numbered data acquisition channel of the base units 602a-b.

The base units 602a-b may be communicatively coupled to the data interface unit 604 using any suitable networking standard (e.g., Ethernet, Token Ring, etc.). In some example implementations, the data interface unit 604 may be implemented using the data collector and processor 114 of FIG. 1. Although the base units 602a-b are shown as being coupled via wires to the data interface unit 604, the base units 602a-b may alternatively be coupled to the data interface unit 604 and/or the network hub 606 via wireless interfaces. In alternative example implementations, the base units 602a-b may be communicatively coupled to a server at a central facility using a wired or wireless communication protocol. Each of the base units 602a-b may be assigned a unique internet protocol (IP) address that enables each of the base units 602a-b to communicate with the data interface unit 604. The data interface unit 604 may store the information received from the base units 602a-b in a database and/or communicate the information to, for example, the central facility.

The base units 602a-b may be powered by an alternating current (AC) source (e.g., a wall outlet) or a direct current (DC) source (e.g., an AC-DC converter plugged into a wall outlet). The satellite units 608 may be powered by the base units 602a-b. Specifically, a cable used to couple a satellite unit 608 to one of the base units 602a-b may include a data communication link that is coupled to one of the data acquisition channels and a power link that is coupled to a power supply of the one of the base units 602a-b.

The units 602a-b and 608 may be placed throughout the monitored environment 100 as described above in connection with the location detection devices 106a-c and each may be assigned a location ID or a unique ID corresponding to a location and/or a zone in which it is located.

Although the example system 600 is described as being able to be used to implement the location detection devices 106a-c of FIG. 1, the location detection system including the location detection devices 106a-c used to generate path of travel information may alternatively be implemented using other devices and systems. Example location-based technologies include the Ekahau Positioning Engine by Ekahau, Inc. of Saratoga, Calif., United States of America, an ultrawideband positioning system by Ubisense, Ltd. of Cambridge, United Kingdom or any of the ultrawideband positioning systems provided by Multispectral Solutions, Inc. of Germantown, Md., United States of America. Ultrawideband positioning systems, depending on the design, offer advantages including long battery life due to low power consumption and high precision. Further, such systems tend to use less of the available signal spectrum.

The Ekahau Positioning Engine may be configured to work with a plurality of standard wireless communication protocol base stations (e.g., the 802.11 protocol, the Bluetooth® protocol, etc.) to broadcast location-related information. By implementing the tag 110 using a suitable wireless communication protocol device and communicatively coupling the location detection devices 106a-c to the tag 110 using the same communication protocol, the Ekahau Positioning Engine may be used to generate location information. In particular, location-related information may be transmitted from the location detection devices 106a-c, received by the tag 110, and used to generate location information using Ekahau Positioning software offered by Ekahau, Inc.

The Ubisense ultrawideband system may be used by providing an ultrawideband receiver to each of the location detection devices 106a-c and providing the tag 110 with an ultrawideband transmitter. In this manner, the tag 110 can transmit ultrawideband signals or chirps (e.g., tag identifier information) that are received by the location detection devices 106a-c. In this manner, the location detection devices 106a-c can measure times of arrival of the received ultrawideband signals and compute the locations of the tag 110 based on these times.

Figure 7:
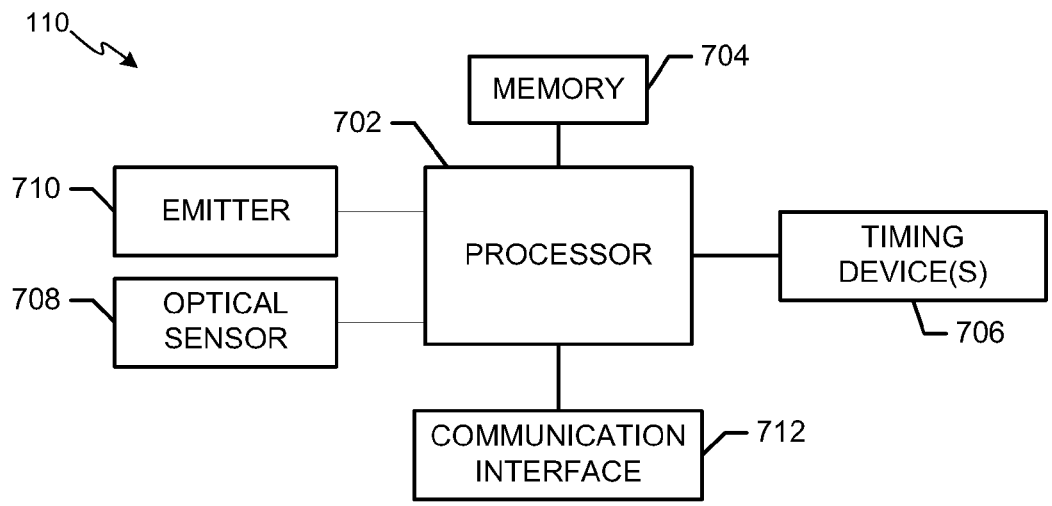
FIG. 7 is a block diagram of an example tag that can be worn or carried by a shopper to generate path of travel information as the shopper moves through a retail establishment.
Figure 8:
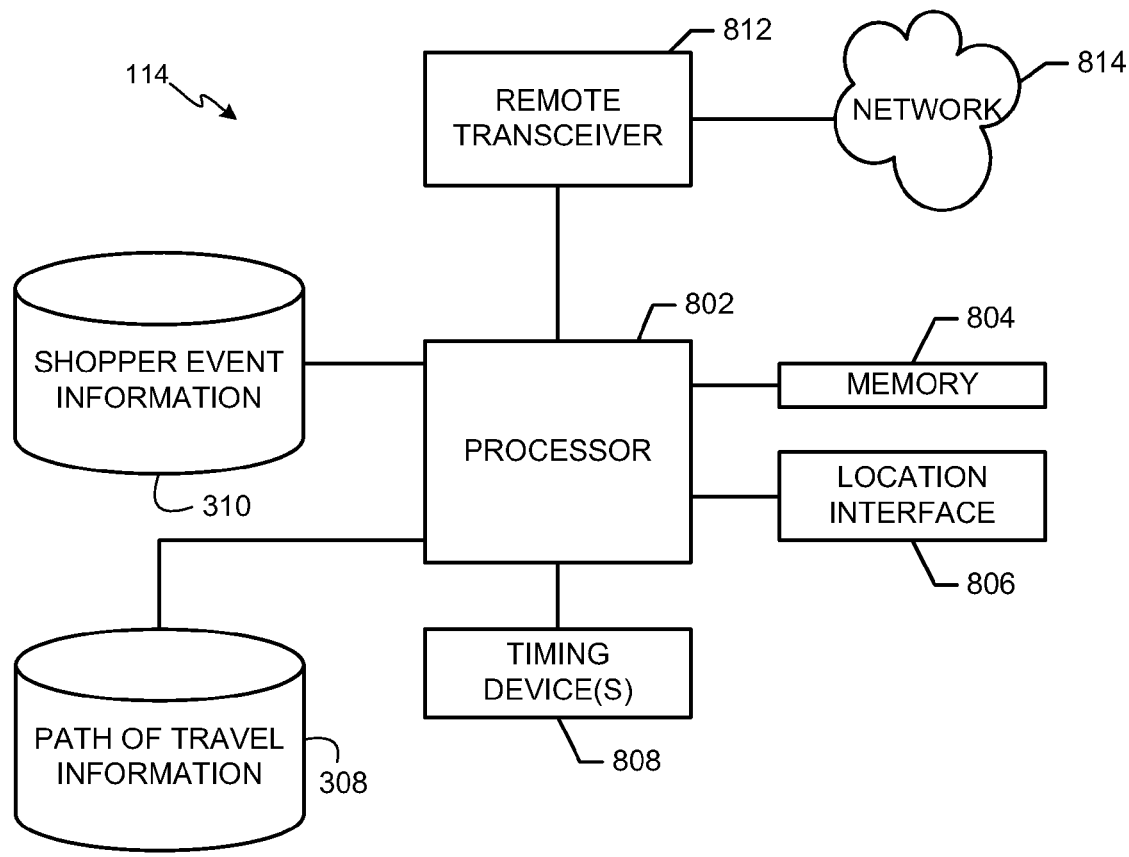
FIG. 8 is a block diagram of a data collector and processor that can be used to collect, process, and analyze measured path of travel information and person detection event information associated with shoppers in a retail establishment.
Figure 9:
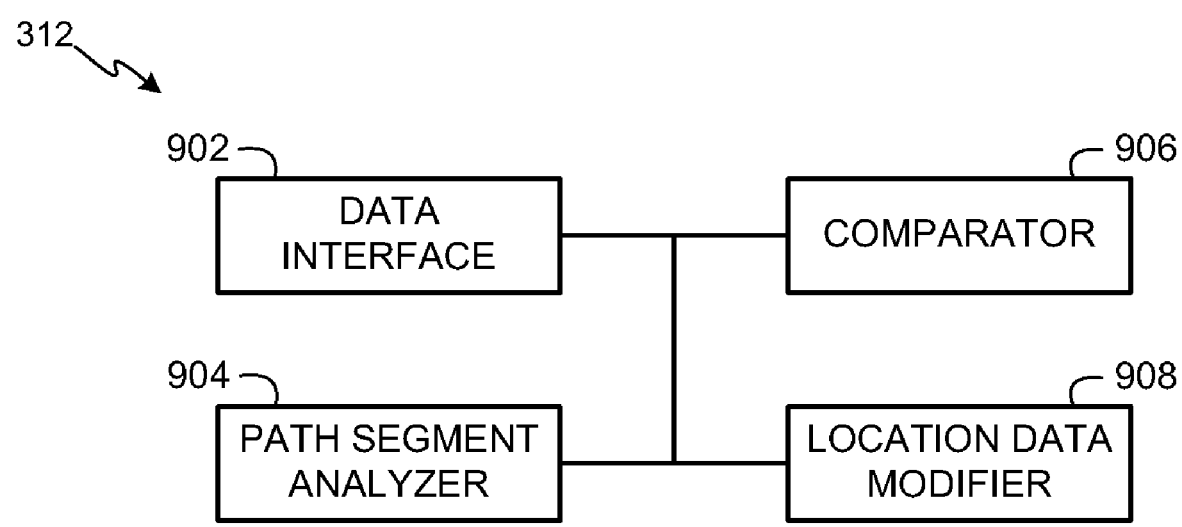
FIG. 9 is a block diagram of an example apparatus that can be used to analyze measured shopper path of travel information to generate adjusted path of travel information.

FIGS. 7-9 are block diagrams of example apparatus that can be used to implement the example methods and systems described herein. In particular, FIG. 7 is a block diagram of the example tag 110 of FIG. 1 that can be worn or carried by a shopper or mounted on a shopping cart or basket to generate path of travel information as the shopper moves through the retail establishment 100 of FIG. 1. FIG. 8 is a block diagram of a data collector and processor 114 that can be used to collect, process, and analyze measured path of travel information and person detection event information associated with shoppers in the retail establishment 100. FIG. 9 is a block diagram of the example shopper path of travel inference apparatus 312 of FIG. 3 that can be used to analyze measured shopper path of travel information to generate adjusted path of travel information.

In the illustrated example of FIG. 7, the example tag 110 includes a processor 702, a memory 704, one or more timing devices 706, an optical sensor 708, an emitter 710, and a communication interface 712. In the illustrated example of FIG. 8, the example data collector and processor 114 includes a processor 802, a memory 804, a location interface 806, one or more timing devices 808, the path of travel information store 308 (also shown in FIG. 3), the shopper event information store 310 (also shown in FIG. 3), and a remote transceiver 812. In the illustrated example of FIG. 9, the example shopper path of travel inference apparatus 312 includes a data interface 902, a path segment analyzer 904, a comparator 906, and a location data modifier 908. Each of the example tag 110, the example data collector and processor 114, and the example shopper path of travel inference apparatus 312 may be implemented using any desired combination of hardware, firmware, and/or software. For example, one or more integrated circuits, discrete semiconductor components, and/or passive electronic components may be used. Thus, for example, any of the processor 702, the memory 704, the timing device(s) 706, the optical sensor 708, the emitter 710, the communication interface 712, the processor 802, the memory 804, the location interface 806, the timing device(s) 808, the path of travel information store 308, the shopper event information store 310, the remote transceiver 812, the data interface 902, the path segment analyzer 904, the comparator 906, and/or the location data modifier 908, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc.

Figure 15:
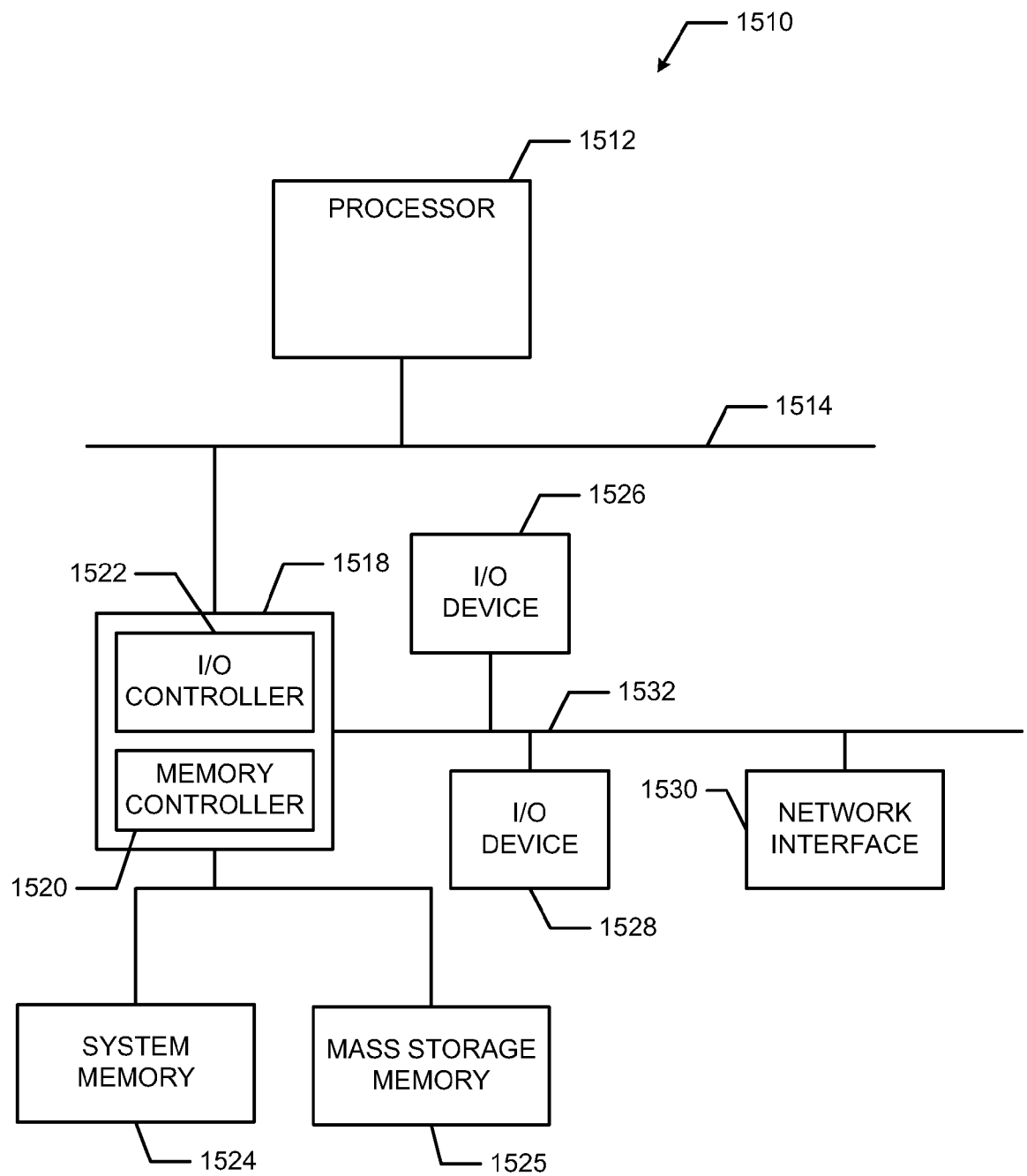
FIG. 15 is a block diagram of an example processor system that may be used to execute the example machine readable instructions of FIGS. 10-14.

Some or all of the processor 702, the memory 704, the timing device(s) 706, the optical sensor 708, the emitter 710, the communication interface 712, the processor 802, the memory 804, the location interface 806, the timing device(s) 808, the path of travel information store 308, the shopper event information store 310, the remote transceiver 812, the data interface 902, the path segment analyzer 904, the comparator 906, and/or the location data modifier 908, or parts thereof, may be implemented using instructions, code, and/or other software and/or firmware, etc. stored on a machine accessible medium and executable by, for example, a processor system (e.g., the example processor system 1510 of FIG. 15). When any of the appended claims are read to cover a purely software implementation, at least one of the processor 702, the memory 704, the timing device(s) 706, the optical sensor 708, the emitter 710, the communication interface 712, the processor 802, the memory 804, the location interface 806, the timing device(s) 808, the path of travel information store 308, the shopper event information store 310, the remote transceiver 812, the data interface 902, the path segment analyzer 904, the comparator 906, and/or the location data modifier 908 is hereby expressly defined to include a tangible medium such as a memory, DVD, CD, etc.

Turning in detail to FIG. 7, the processor 702 of the tag 110 may be implemented using any processor or controller suitable for controlling the tag 110 and managing or processing data related to detecting the location of the tag 110 in the example retail establishment 100 (or any other monitored environment). For example, the processor 702 may be implemented using a controller, a general purpose processor, a digital signal processor, or any combination thereof. The processor 702 may be configured to perform and control various operations and features of the tag 110 such as, for example, setting the tag 110 in different operating modes, controlling a chirp emission interval duration, managing communication operations, etc.

The tag 110 is provided with the memory 704 to store software/firmware instructions for controlling the operations of the tag 110. In addition, the memory 704 can be used to store profile information identifying the tag 110 and can also store any data collected by the tag 110. The memory 704 may be implemented using any suitable volatile and/or non-volatile memory including a random access memory (RAM), a read-only memory (ROM), a flash memory device, a hard drive, an optical storage medium, etc. In addition, the memory 704 may be any removable or non-removable storage medium.

The tag 110 is provided with the one or more timing devices 706 to generate timestamps or to implement any timing operations. The one or more timing devices 706 may be implemented using a clock (e.g., a real-time clock), a timer, a counter, or any combination thereof. Although the timing device(s) 706 is shown as separate from the processor 702, in some example implementations the timing device(s) 706 may be integrated with the processor 702.

The tag 110 is provided with the emitter 710 to emit chirps. The emitter 710 may be implemented using a radio frequency (RF) or acoustic transmitter to emit RF or acoustic chirps detectable by the location detection devices 106*a-c* located throughout the retail establishment 100 of FIG. 1. In this manner, the tag 110 can provide signals to update its location as a shopper moves through the retail establishment 100. The chirps may be encoded with a tag ID identifying the tag 1101. In some example implementations, the chirps may also be encoded with timestamps generated using the timing device(s) 706 and indicative of when the tag 110 emitted the chirps.

The tag 110 is provided with the communication interface 712 to communicate information between the tag 110 and other processor systems including, for example, the location detection devices 106*a-c* and/or the data collector and processor 114 of FIG. 1. The communication interface 712 may be implemented using any type of suitable wired or wireless transmitter, receiver, or transceiver including a Bluetooth transceiver, an 802.11 transceiver, a cellular communications transceiver, an optical communications transceiver, etc.

The tag 110 is provided with the optical sensor 708 to monitor the surrounding areas through which a shopper moves to determine the shopper's proximity to aisle entrances/exits by detecting light emitted by the people detectors 108*a-h* of FIG. 1. For example, in some example implementations, the tag 110 may be configured to emit chirps at a faster rate or interval whenever the shopper is entering or exiting an aisle (e.g., one of the aisles A-C of FIG. 1) so that higher time-resolution positioning or location information can be collected for the tag 110. In this manner, collecting location points that are closer in time increases the probability of finding a match between a timestamp of a location datum collected using the location detection devices 106*a-c* and a timestamp of a shopper detection event generated by a people detector (e.g., one of the people detectors 108*a-h*) when determining whether a shopper entered or exited a particular aisle or zone. In the illustrated example, the optical sensor 708 may be, for example, a light sensitive diode, an infrared (IR) sensor, a complimentary metal oxide semiconductor (CMOS) sensor array, a charge-coupled diode (CCD) sensor array, etc.

Turning in detail to FIG. 8, the data collector and processor 114 is provided with the processor 802 to control and perform various operations or features of the data collector and processor 114 and may be implemented using any suitable processor, including any controller, general purpose processor, digital signal processor, or any combination thereof. For example, the processor 802 may be configured to receive location information from the location detection devices 106*a-c* and shopper detection event information from the people detectors 108*a-h*.

The processor 802 may also be configured to control communication processes that occur between the data collector and processor 114 and other systems or devices (e.g., the tag 110, the location detection devices 106*a-c*, the people detectors 108*a-h*, and/or a server at a remotely located data collection facility). In some example implementations, the processor 802 may control the chirp emission rate or intervals of the tag 110 by communicating control commands or triggers to the tag 110 whenever it detects that the tag 110 is located proximate an aisle entrance/exit of an aisle or zone. In this manner, higher time-resolution location points for the tag 110 can be collected and used as discussed above in connection with the optical sensor 708.

The data collector and processor 114 is provided with the memory 804 to store software/firmware instructions to control the operations of the data collector and processor 114. The data collector and processor 114 is provided with the location interface 806 to determine locations of tags (e.g., the tag 110) as the tags are moved through a monitored area (e.g., the retail establishment 100 of FIG. 1). For example, when the tag 110 emits a chirp detected by one or more of the location detection devices 106*a-c*, information indicative of the detected chip can be communicated to the data collector and processor 114 by the one or more of the location detection devices 106*a-c*. The location interface 806 can then determine the location of the tag 110 within the retail establishment 100 based on signal characteristics of the detected chirp and/or information embedded in the detected chirp using any known technique including techniques associated with the location detection systems (e.g., the Ekahau Positioning Engine or an ultrawideband positioning system) discussed above or any other location detection system. In the illustrated example, the location interface 806 can also be implemented to identify a shopping zone (e.g., one of the aisles A-C of FIG. 1) in which the tag 110 is located based on the computed location information. For example, the location interface 806 can access a data structure such as the zone boundary data structure 500 of FIG. 5 to look up or retrieve a zone identifier based on the location information. The processor 802 can store the location information and/or the zone identifier in association with a timestamp and a corresponding tag ID in the path of travel information store 308.

The data collector and processor 114 is provided with the one or more timing devices 808 to generate timestamps or to implement any timing operations. The one or more timing devices 808 may be implemented using a clock (e.g., a real-time clock), a timer, a counter, or any combination thereof. Although the timing device(s) 808 is shown as separate from the processor 802, in some example implementations the timing device(s) 808 may be integrated with the processor 802.

In the illustrated example, the path of travel information store 308 and the shopper event information store 310 can be implemented using databases or any other type of data structure and can be stored in the memory 804 or in a separate memory. The processor 802 can store received location information in the path of travel information store 308 and shopper detection event information in the shopper event information store 310. In some example implementations, the processor 802 may process the information to generate the adjusted shopper path of travel 202 of FIG. 2. In some example implementations, the processor 802 can cause the remote transceiver 812 to communicate the measured shopper path of travel information and adjusted shopper path of travel information to a data collection facility. In other example implementations, the processor 802 may be configured not to process the measured shopper path of travel information but instead to communicate the measured shopper path of travel information to another system (e.g., a server at a data collection facility) that is configured to process the measured shopper path of travel information to generate the adjusted shopper path of travel 202.

In the illustrated example, the remote transceiver 812 may be communicatively coupled to a network 814 and may be implemented using any suitable wired or wireless communication transceiver including, for example, a telephone modem, a DSL modem, a cable modem, a cellular communication circuit, an Ethernet communication circuit, an 802.11 communication circuit, etc.

Now turning in detail to FIG. 9, the example shopper path of travel inference apparatus 312 may be implemented in connection with the data collector and processor 114 or may be implemented as a separate apparatus to analyze the measured shopper path of travel 104 (FIGS. 1 and 2) to generate the adjusted shopper path of travel 202 (FIG. 2). In the illustrated example, the example shopper path of travel inference apparatus 312 is provided with the data interface 902 to retrieve information from memory and store information in memory. For example, the data interface 902 may be configured to retrieve measured shopper path of travel information and shopper detection event information from, for example, the path of travel information store 308 and the shopper event information store 310, respectively, of FIG. 8. In addition, the data interface 902 may be configured to store processed shopper path of travel information in the path of travel information store 308.

The example shopper path of travel inference apparatus 312 is provided with the path segment analyzer 904 to analyze portions of measured shopper paths of travel. For example, the path segment analyzer 904 may be configured to analyze collected location points (e.g., location points collected at the times t0-t8 of FIGS. 1 and 2) to determine whether any collected location datum requires adjusting to more accurately represent a shopper's actual location.

The example shopper path of travel inference apparatus 312 is provided with the comparator 906 to compare time stamps associated with collected location data with time stamps associated with person detection events. In this manner, the shopper path of travel inference apparatus 312 can determine whether a shopper was located in a particular aisle or zone by determining when the shopper passed by or was proximately located to a people detector (e.g., one of the people detectors 108*a-h* of FIG. 1) at an entrance/exit of that aisle or zone.

The example shopper path of travel inference apparatus 312 is provided with the location data modifier 908 to adjust or change location data to represent different location points. For example, when the path segment analyzer 904 determines that a particular location datum is inaccurate and does not represent (within some acceptable error) the actual location of a shopper, the location data modifier 908 can adjust or change the location datum to more accurately represent the actual location of the shopper.

Flow diagrams depicted in FIGS. 10-14 are representative of machine readable and executable instructions or processes that can be executed to implement the example tag 110 of FIGS. 1 and 7, the example data collector and processor 114 of FIGS. 1 and 8, and the example shopper path of travel inference apparatus 312 of FIGS. 3 and 9. The example processes of FIGS. 10-14 may be performed using a processor, a controller and/or any other suitable processing device. For example, the example processes of FIGS. 10-14 may be implemented using coded instructions stored on a tangible medium such as a flash memory, a read-only memory (ROM) and/or random-access memory (RAM) associated with a processor (e.g., the processor 1512 of FIG. 15). Alternatively, some or all of the example processes of FIGS. 10-14 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 10-14 may be implemented manually or as any combination(s) of any of the foregoing techniques, for example, any combination of firmware, software, discrete logic and/or hardware. Further, although the example processes of FIGS. 10-14 are described with reference to the flow diagrams of FIGS. 10-14, other methods of implementing the processes of FIGS. 10-14 may be employed. For example, the order of execution of the blocks may be changed, and/or some of the blocks described may be changed, eliminated, sub-divided, or combined. Additionally, any or all of the example processes of FIGS. 10-14 may be performed sequentially and/or in parallel by, for example, separate processing threads, processors, devices, discrete logic, circuits, etc.

Figure 10:
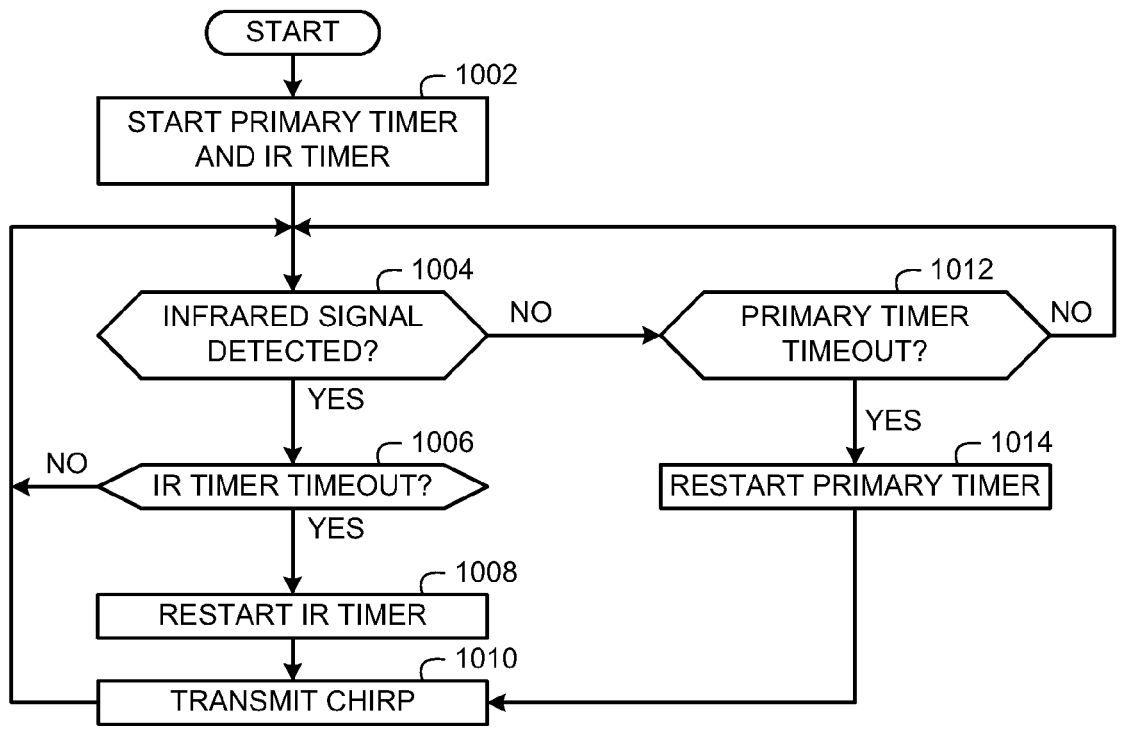
FIG. 10 is a flow diagram representative of machine readable instructions that can be executed by the tag of FIGS. 1 and 7 to emit chirps for generating measured path of travel information as the shopper moves through the retail establishment of FIG. 1.

Turning to FIG. 10, the depicted flow diagram is representative of an example process that may be performed to implement the example tag 110 of FIGS. 1 and 7. The example process causes the example tag 110 to emit chirps to enable the data collector and processor 114 to determine the locations of the tag 110. In the illustrated example, the example process causes the tag 110 to emit chirps based on a primary timer timeout or detecting proximity of the tag 110 to the people detectors 108*a-h*. For example, while the tag 110 is not near one of the people detectors 108*a-h*, the tag 110 can emit chirps at relatively long intervals (i.e., low chirp rate) (e.g., 10 seconds), and when the tag 110 is near one of the people detectors 108*a-h*, the tag 110 can emit chirps at relatively shorter intervals (i.e., high chirp rate) (e.g., 1 second) to increase the probability of finding timestamp matches between a shopper detection event generated by one of the people detectors 108*a-h* and a location point collected using the location detection devices 106*a-c* based on the emitted chirps. In the illustrated example of FIG. 10, the tag 110 can detect its proximity to any one of the people detectors 108*a-h* based on detecting infrared signals emitted by the people detectors 108*a-h*.

The example process of FIG. 10 begins with the processor 702 (FIG. 7) starting a primary timer and an infrared (IR) timer (block 1002). In the illustrated example, the primary timer and the IR timer are implemented using the timing devices 706 of FIG. 7. The primary timer is used to trigger chirp emissions by the tag 110 at relatively long intervals (e.g., 10 seconds). The IR timer is used to trigger chirp emissions by the tag 110 at relatively short intervals (e.g., 1 second) based on the tag 110 detecting proximity to the people detectors 108*a-h*. The IR timer is used to control the duration of the shortened chirp interval when the tag 110 is proximate any of the people detectors 108*a-h*. In this manner, detection of an IR signal from the people detectors 108*a-h* alone does not trigger the tag 110 to emit a chirp that would lead to an excessively high chirp rate. Thus, using the IR timer, the tag 110 is operated to emit chirps at the relatively shorter intervals only when the optical sensor 708 detects an IR signal in combination with a time out event of the IR timer.

The processor 702 determines whether the optical sensor 708 (FIG. 7) has detected an infrared signal (block 1004) (indicating proximity to an entrance or exit of a zone). If the optical sensor 708 has detected an infrared signal (block 1004), the processor 702 determines whether the IR timer has timed out (block 1006). If the IR timer has not timed out (block 1006), control is passed back to block 1004. Otherwise, if the IR timer has timed out (block 1006), the processor 702 restarts the IR timer (block 1008) to continue the higher chirp rate. After the processor 702 restarts the IR timer (block 1008), the emitter 710 (FIG. 7) emits a chirp (block 1010) and control is passed back to block 1004.

Returning to block 1004, when the processor 702 determines that the optical sensor 708 has not detected an infrared signal (block 1004), the processor 702 determines whether the primary timer has timed out (block 1012). If the primary timer has timed out (block 1012), the processor 702 restarts the primary timer (block 1014). The emitter 710 then emits a chirp (block 1010) and control is passed back to block 1004. The example process of FIG. 10 can stop if the tag 110 is turned off or the processor 702 receives a command or instruction to stop emitting chirps.

Figure 11:
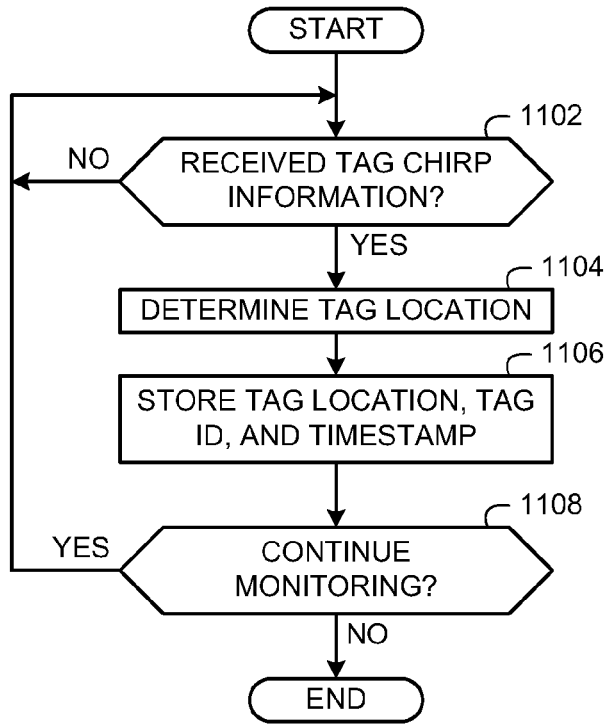
FIG. 11 is a flow diagram representative of machine readable instructions that can be executed by the data collector and processor of FIGS. 1 and 8 to collect measured path of travel information.

Turning now to FIG. 11, the depicted flow diagram is representative of an example process that may be performed to implement the example data collector and processor 114 of FIGS. 1 and 8. The example process causes the example data collector and processor 114 to detect chirps and collect location information indicative of locations of tags (e.g., the tag 110 of FIGS. 1 and 7) as shoppers move through a monitored environment such as the retail establishment 100 of FIG. 1. Initially, the processor 802 (FIG. 8) determines whether it has received tag chirp information (block 1102). In the illustrated example, the processor 802 receives tag chirp information via the remote transceiver 812 from the location detection devices 106a-c. The tag chirp information can be provided with information generated by the location detection devices 106a-c including, for example, a timestamp of chirp detection/emission, signal characteristics of the chirp (e.g., signal strength, angle of detection, frequency, etc.), data embedded in the chirps (e.g., tag ID, emission timestamp, etc.), etc.

If the processor 802 determines that it has not received tag chirp information (block 1102), it continues to monitor for tag chirp information at block 1102. When the processor 802 determines that it has received tag chirp information (block 1102), the location interface 806 (FIG. 8) determines the location of the tag 110 (block 1104) and stores the tag location, tag ID, and a corresponding timestamp (block 1106) in the path of travel information store 308. The processor 802 then determines whether to continue monitoring for chirp information (block 1108). If the monitoring process remains enabled, the processor 802 can continue to monitor for chirp information by returning control to block 1102. Otherwise, if the monitoring process is disabled or instructed to stop monitoring operations, the example process of FIG. 11 is ended.

Figure 12:
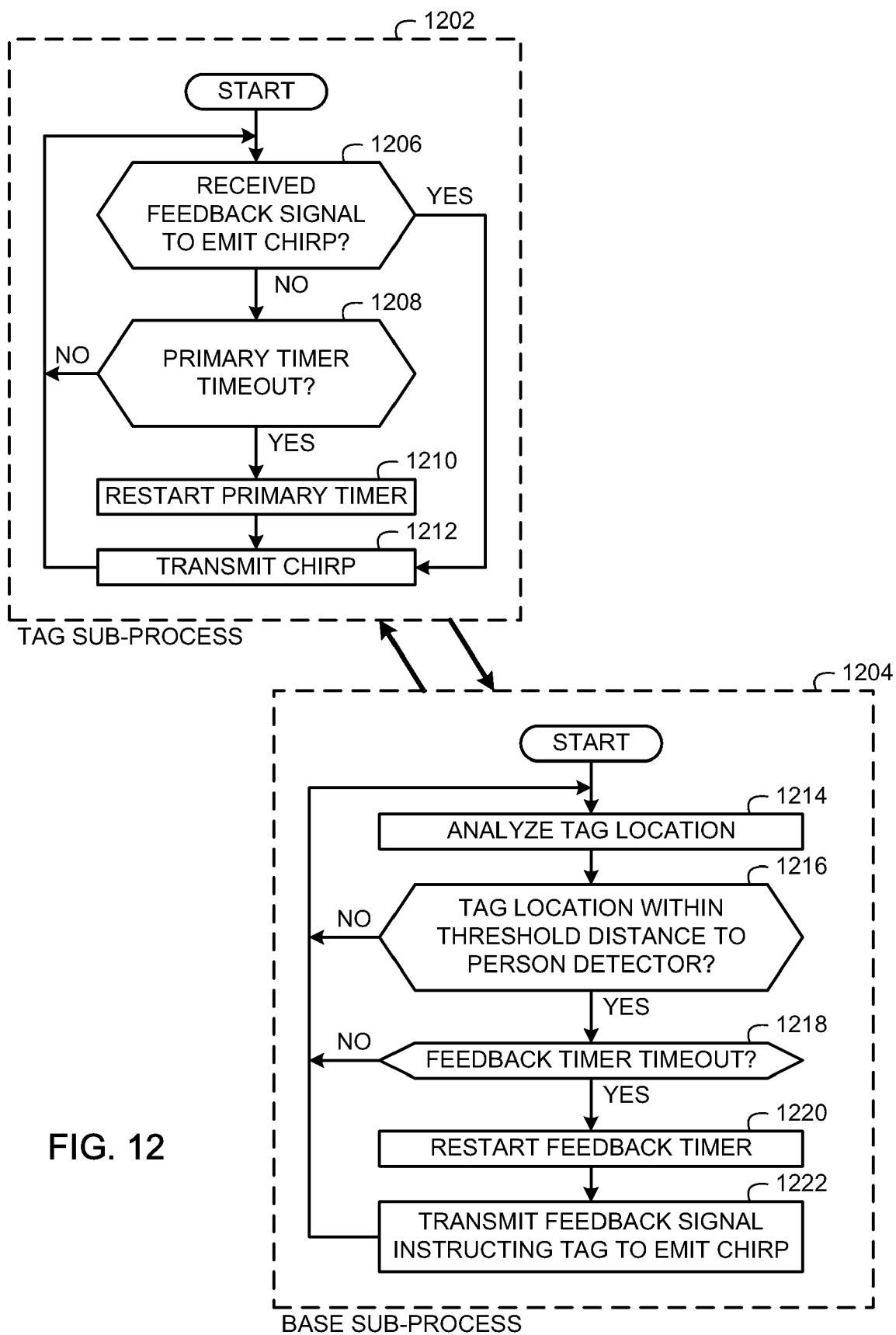
FIG. 12 is a flow diagram representative of machine readable instructions that can be executed to cause the tag of FIGS. 1 and 7 to emit chirps for generating measured path of travel information as the shopper moves through the retail establishment of FIG. 1.

Turning now to FIG. 12, the depicted flow diagrams are representative of an example process that may be performed to implement the example tag 110 of FIGS. 1 and 7 and the example data collector and processor 114 of FIGS. 1 and 8. The example process includes a tag sub-process 1202 and a base sub-process 1204. The tag sub-process 1202 causes the example tag 110 to emit chirps based on a primary timer or a feedback signal emitted by the data collector and processor 114 based on the base sub-process 1204. The base sub-process 1204 controls how often the tag 110 emits chirps when the tag 110 is proximate to one of the people detectors 108a-h. For example, while the tag 110 is not near one of the people detectors 108a-h, the tag 110 can emit chirps at relatively long intervals (e.g., 10 seconds) based on the primary timer, and when the data collector and processor 114 determines that the tag 110 is near one of the people detectors 108a-h, the data collector and processor 114 can instruct the tag 110 to emit chirps at relatively shorter intervals (e.g., 1 second). In this manner, there can be a relatively higher probability of finding timestamp matches between a shopper detection event generated by one of the people detectors 108a-h and a location point collected using the location detection devices 106a-c based on the emitted chirps. In the illustrated example of FIG. 12, the data collector and processor 114 can detect proximity of the tag 110 to any one of the people detectors 108a-h based comparing the locations of the tag 110 to the known, fixed locations of the people detectors 108a-h.

Initially, in the tag sub-process 1202, the processor 702 (FIG. 7) determines whether it has received a feedback signal to emit a chirp (block 1206). In the illustrated example, the processor 702 receives feedback signals (e.g., triggers) from the data collector and processor 114 via the communication interface 712 (FIG. 7) when the data collector and processor 114 determines that the tag 110 is proximate to one of the people detectors 108a-h. If the processor 702 determines that it has not received a feedback signal to emit a chirp (block 1206), the processor 702 determines whether a primary timer (e.g., one of the timing devices 706 of FIG. 7) has timed out (block 1208). In the illustrated example, the primary timer is used to cause the tag 110 to emit chirps at relatively long intervals. If the timer has not timed out (block 1208), control returns to block 1206. Otherwise, the processor 702 restarts the primary timer (block 1210). After the processor 702 restarts the primary timer (block 1210) or if the processor 702 determines that it has received a feedback signal (block 1206), the emitter 710 (FIG. 7) emits a chirp (block 1212) and control returns to block 1206.

Turning to the base sub-process 1204, the location interface 806 (FIG. 8) analyzes the location of the tag 110 (block 1214) based on, for example, chirp information received by the data collector and processor 114. If the location interface 806 determines that the tag 110 is within a threshold distance to one of the person detectors 108a-h (block 1216), the processor 802 (FIG. 8) determines whether a feedback timer (e.g., one of the timing devices 808 of FIG. 8) has timed out (block 1218). The feedback timer is used to send feedback signals to the tag 110 to trigger the tag 110 to emit chirps at relatively short intervals (e.g., 1 second) when the tag 110 is proximate to the people detectors 108a-h. The feedback timer is used to control the duration of the shortened chirp interval when the tag 110 is proximate to any of the people detectors 108a-h. In this manner, detection of the proximity of the tag 110 to the people detectors 108a-h alone does not cause the tag 110 to emit a chirp that would lead to an excessively high chirp rate. Thus, using the feedback timer in the data collector and processor 114, the tag 110 is operated to emit chirps at the relatively shorter intervals only when the location interface 806 detects proximity of the tag 110 to the people detectors 108a-h in combination with a time out event of the feedback timer.

If the feedback timer has timed out (block 1218), the processor 802 restarts the feedback timer (block 1220) and communicates a feedback signal to the tag 110 (block 1222) via the remote transceiver 812 (FIG. 8). After the processor 802 communicates the feedback signal (block 1222) or if the feedback timer has not timed out (block 1218) or if the location of the tag 110 is not within a threshold distance to one of the people detectors 108a-h, control returns to block 1214. The example process of FIG. 12 can end whenever the process is disabled or instructed not to continue executing.

Although the example processes of FIGS. 10 and 12 are shown as enabling the tag 110 to emit chirps (or signals) at two different rates based on whether the tag 110 is proximately located or distantly located from entrances/exits of zones, in other example implementations, the tag 110 may be implemented to emit chirps (or signals) at only one chirp rate (or signal emission rate). For example, the tag 110 may be configured to emit chirps only at the relatively long interval or only at the relatively short interval. In other example implementations, the tag 110 may be configured to emit chirps or signals at more than two emission rates. In addition, while the example processes of FIGS. 10 and 12 are described as enabling the tag 110 to emit chirps or signals at a first rate when it is not proximate or relatively close to one of the people detectors 108a-h and at a second rate when it is proximate or relatively close to one of the people detectors 108a-h, in other example implementations, the chirp rate or signal emission rate of the tag 110 may be incrementally increased as the distance between the tag 110 and any one of the people detectors 108a-h decreases and gradually decreased as the tag 110 is moved away from any one of the people detectors 108a-h.

Figure 13:
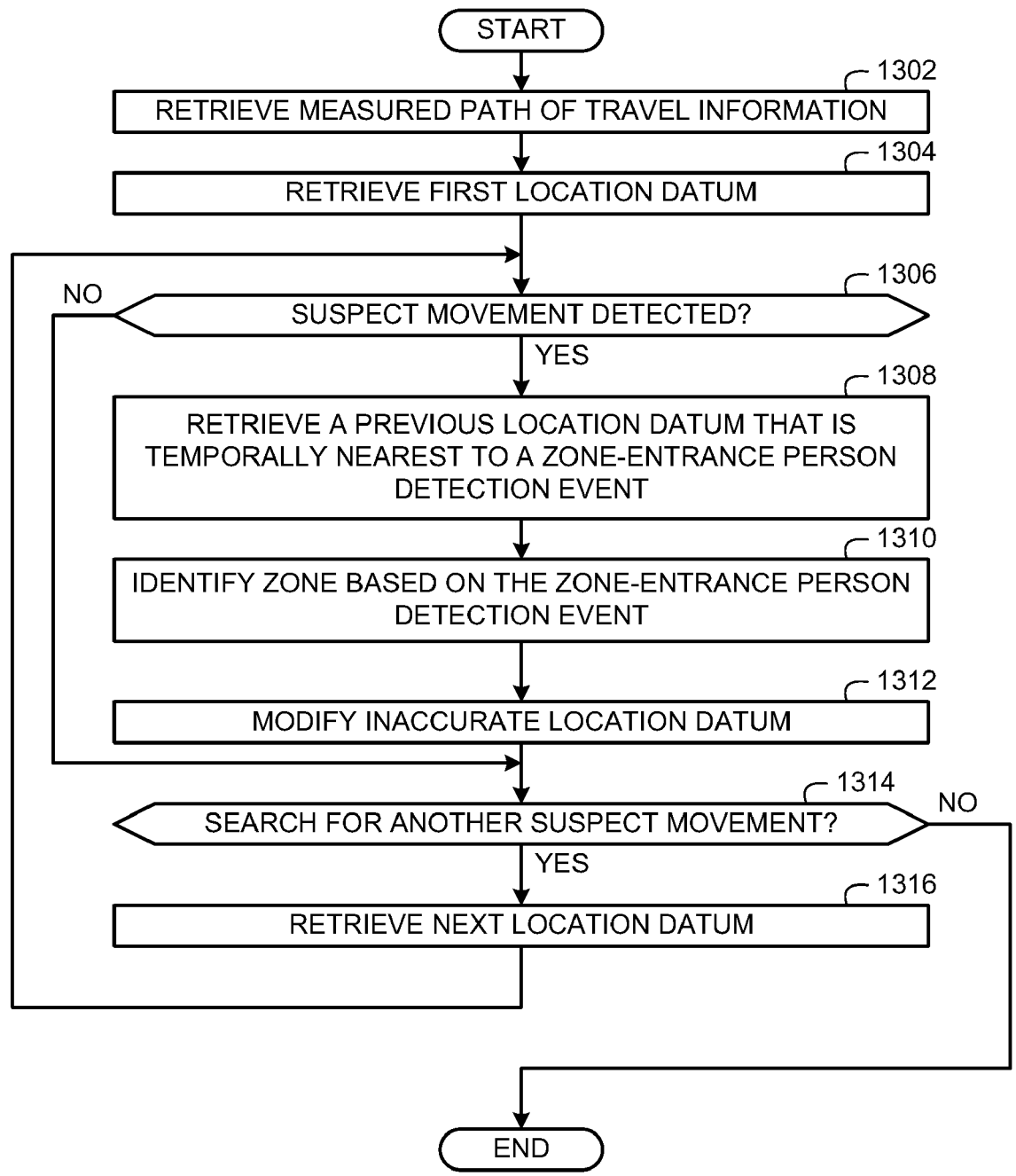
FIG. 13 depicts a flow diagram representative of machine readable instructions that can be executed by the shopper path of travel inference apparatus 312 of FIGS. 3 and 9 to process the measured path of travel information to generate adjusted path of travel information.

Now turning to FIG. 13, the depicted flow diagram is representative of an example process that may be performed to implement the example shopper path of travel inference apparatus 312 of FIGS. 3 and 9 to generate the processed path of travel information representative of, for example, the processed shopper path of travel 202 of FIG. 2 based on measured path of travel information representative of, for example, the measured shopper path of travel 104 of FIGS. 1 and 2. In the illustrated example, measured path of travel information and processed path of travel information can be accessed (e.g., retrieved and stored) in a data structure similar or identical to the travel path data structure 400 of FIG. 4.

Initially, the data interface 902 (FIG. 9) retrieves measured path of travel information (block 1302) from, for example, the path of travel information store 308 (FIGS. 3 and 8). For example, the data interface 902 can retrieve measured path of travel information representative of the measured path of travel 104 of FIGS. 1 and 2. The data interface 902 then retrieves a first location datum from the measured path of travel information (block 1304), and the path segment analyzer 904 (FIG. 9) determines whether the retrieved location datum is indicative of a suspect movement (block 1306). For example, the path segment analyzer 904 may detect a suspect movement if the location datum indicates a brief or erratic deviation between zones such as a previously collected location datum being indicative of a first zone (e.g., the location datum collected at time t4 indicative of aisle B as shown in FIG. 1), the current location datum being indicative of a second zone (e.g., the location datum collected at time t5 indicative of aisle A as shown in FIG. 1), and a subsequently collected location datum being back in the first zone (e.g., the location datum collected at time t6 indicative of aisle B as shown in FIG. 1).

If a suspect movement is detected (block 1306), the data interface 902 retrieves a previous location datum that is temporally nearest to a zone-entrance person detection event (block 1308). A zone-entrance person detection event is a person detection event generated by one of the people detectors 108a-h indicative of a direction of travel that corresponds to a person entering a zone (e.g., one of the aisles A-C of FIG. 1). To retrieve a previous location datum that is temporally nearest to a zone-entrance person detection event, the data interface 902 can operate in combination with the comparator 906 (FIG. 9) to find a location datum (e.g., the location point collected at time t4 noted on the measured path of travel 104 of FIG. 1) in the retrieved measured path of travel information having a timestamp that substantially matches or is equal to a timestamp of a zone-entrance person detection event stored in the shopper event information store 310 (FIGS. 3 and 8). In some instances, due to inaccuracies that may occur in the generated location data, the location indicated by the previous location datum may be in one zone (e.g., aisle B of FIG. 1), while a temporally matching zone-entrance person detection event may have been generated by one of the people detectors 108a-h in a different zone (e.g., aisle A or aisle C of FIG. 1). Thus, the data interface 902 and the comparator 906 can be configured to compare timestamps of location data with timestamps of zone-entrance person detection events generated in neighboring zones that are within a threshold distance (e.g., an error radius) from the location indicated by the previous location data.

The path segment analyzer 904 identifies a zone (e.g., one of the aisles A-C of FIG. 1) based on the zone-entrance person detection event (block 1310). That is, the data interface 902 determines which one of the people detectors 108a-h generated the zone-entrance person detection event and identifies the zone in which that one of the people detectors 108a-h is located. The location data modifier 908 (FIG. 9) then modifies the inaccurate location datum (block 1312) retrieved at block 1304 to represent a location in the zone identified at block 1310. The data interface 902 can store the modified location datum in, for example, the adjusted path of travel column 408 of FIG. 4.

After the location datum is modified (block 1312) or if the path segment analyzer 904 determines that the location datum does not indicate a suspect movement (block 1306), the shopper path of travel inference apparatus 312 determines whether to search for another suspect movement (block 1314). If the shopper path of travel inference apparatus 312 determines that it should search for another suspect movement (block 1314), the data interface 902 retrieves a next location datum from the retrieved measured path of travel information (block 1316) and control returns to block 1306. Otherwise, if the shopper path of travel inference apparatus 312 determines that it should not search for another suspect movement (block 1314), the example process of FIG. 13 is ended.

Figure 14:
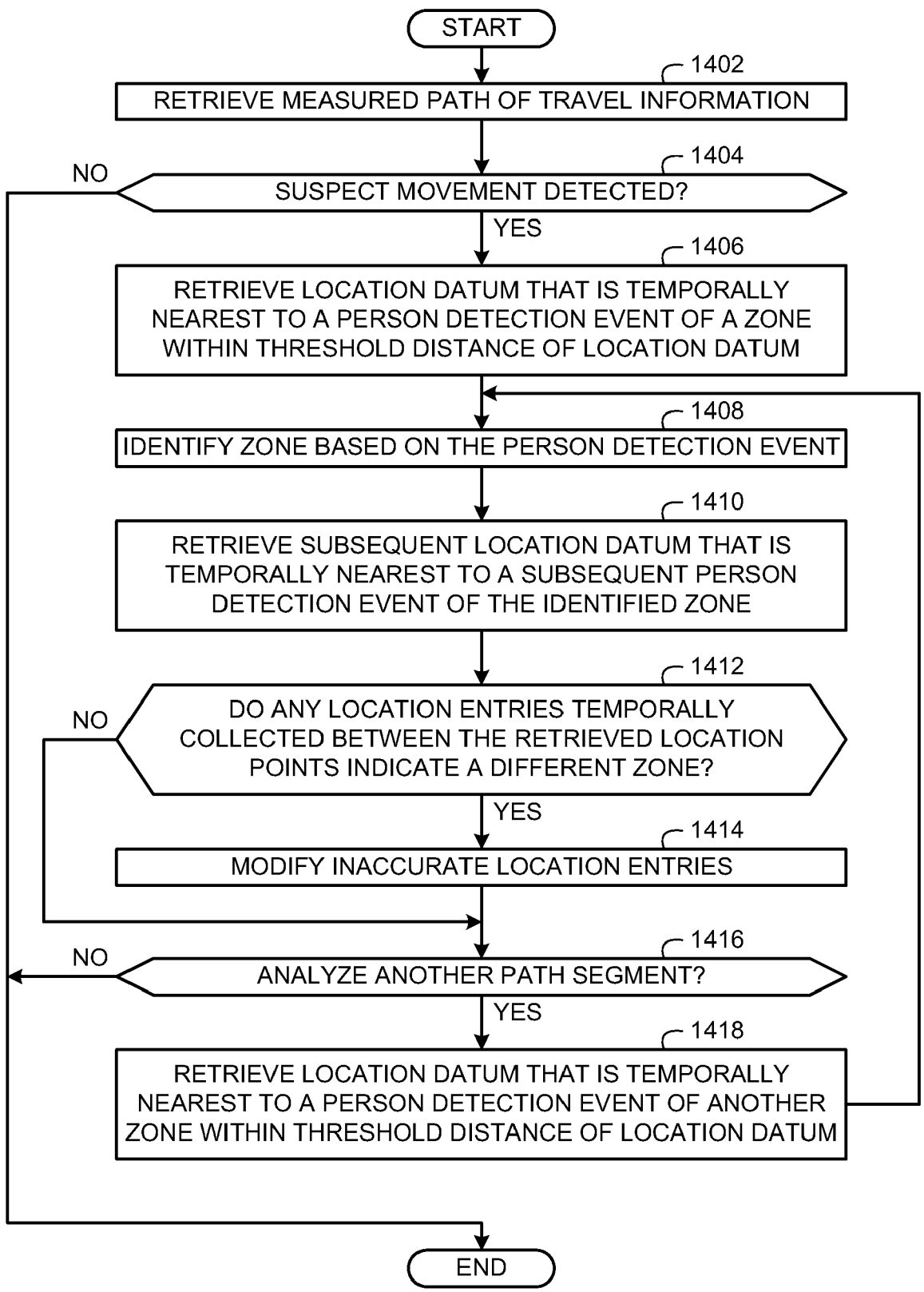
FIG. 14 depicts another flow diagram representative of machine readable instructions that can be executed by the shopper path of travel inference apparatus 312 of FIGS. 3 and 9 to process the measured path of travel information to generate adjusted path of travel information.

Now turning to FIG. 14, the depicted flow diagram is representative of another example process that may be performed to implement the example shopper path of travel inference apparatus 312 of FIGS. 3 and 9 to generate the processed path of travel information representative of, for example, the processed shopper path of travel 202 of FIG. 2 based on measured path of travel information representative of, for example, the measured shopper path of travel 104 of FIGS. 1 and 2. In the illustrated example, measured path of travel information and processed path of travel information can be accessed (e.g., retrieved and stored) in a data structure similar or identical to the travel path data structure 400 of FIG. 4.

Initially, the data interface 902 (FIG. 9) retrieves measured path of travel information (block 1402) from, for example, the path of travel information store 308 (FIGS. 3 and 8). For example, the data interface 902 can retrieve measured path of travel information representative of the measured path of travel 104 of FIGS. 1 and 2. If the path segment analyzer 904 (FIG. 9) detects a suspect movement (excursion or deviation) (block 1404) (e.g., a deviation from a first zone to a second zone and back to the first zone as shown by way of example in FIG. 1 at times t4-t6), the data interface 902 retrieves a location datum (or a location point) from the retrieved measured path of travel information that is temporally nearest to a person detection event of a zone that is associated with the suspect movement and is within a threshold distance of the location datum (block 1406). For example, the data interface 902 can operate in combination with the comparator 906 to find a location datum (e.g., the location point collected at time t4 noted on the measured path of travel 104 of FIG. 1) in the retrieved measured path of travel information having a timestamp that substantially matches or is equal to a timestamp of a person detection event stored in the shopper event information store 310 (FIGS. 3 and 8). In some instances, due to inaccuracies that may occur in the generated location data, the location indicated by the location datum may be in one zone (e.g., aisle B of FIG. 1), while a temporally matching person detection event may have been generated by one of the people detectors 108*a-h* in a different zone (e.g., aisle A or aisle C of FIG. 1). Thus, the data interface 902 and the comparator 906 can be configured to compare timestamps of location datum with timestamps of person detection events generated in neighboring zones that are within a threshold distance (e.g., an error radius) from the location indicated by the location datum. When there is a mismatch in zones between a person detection event and a corresponding location datum, the location datum can be adjusted to represent a location within the zone associated with the person detection event as discussed below in connection with blocks 1412 and 1414.

After the data interface 902 has retrieved a location datum at block 1406, the path segment analyzer 904 identifies a zone (e.g., one of the aisles A-C of FIG. 1) based on the person detection event (block 1408). That is, the data interface 902 determines which one of the people detectors 108*a-h* generated the person detection event and identifies the zone in which that one of the people detectors 108*a-h* is located. The data interface 902 retrieves a subsequent location datum that is temporally nearest to a subsequent person detection event associated with the identified zone (block 1410). For example, referring to FIG. 1, the data interface 902 can retrieve the location point collected at time t8 noted on the measured path of travel 104. In the illustrated example, the person detection event identified at block 1406 represents a shopper entry into the identified zone, while the person detection event identified at block 1410 represents the shopper exiting the identified zone. In some example implementations, the entry and exiting of a shopper to/from an identified zone can be confirmed using direction of travel information generated by the people detectors 108*a-h* and stored in association with the person detection events in the shopper event information store 310.

The path segment analyzer 904 determines whether any location entries of the measured path of travel information that were temporally collected between the retrieved location points indicate a different zone (block 1412) than the zone identified at block 1408. For example, referring to the measured path of travel 104, the path segment analyzer 904 can determine whether the any of the location points collected at times t5-t6 indicate a zone other than aisle B. The illustrated example of FIG. 1 shows that the location point collected at t5 indicates aisle A, the location point collected at t6 indicates aisle B, and the location point collected at t7 indicates aisle C. Thus, at block 1412, the path segment analyzer 904 flags the location points associated with times t5 and t7 as inaccurate.

If the path segment analyzer 904 determines that any location entry indicates a different zone than the zone identified at block 1408 (block 1412), the location data modifier 908 (FIG. 9) modifies the inaccurate location entries to represent locations within the same zone as the zone identified at block 1408 (block 1414). The data interface 902 can store the modified location datum in, for example, the adjusted path of travel column 408 of FIG. 4. After the location entries are modified (block 1414) or if the path segment analyzer 904 determines that none of the location entries indicates a different zone than the zone identified at block 1408 (block 1412), the shopper path of travel inference apparatus 312 determines whether another segment of the retrieved measured path of travel information should be analyzed (block 1416). If there is another path segment to be analyzed (block 1416), the data interface 902 retrieves another location datum (or a location point) from the retrieved measured path of travel information that is temporally nearest to a person detection event of another zone within a threshold distance of the location datum (block 1418) and control returns to block 1408. Otherwise, if there is not another path segment to be analyzed (block 1416), the example process of FIG. 14 is ended.

FIG. 15 is a block diagram of an example processor system 1510 that may be used to implement the example apparatus, methods, and articles of manufacture described herein. For example, processor systems substantially similar or identical to the example processor system 1510 may be used to implement the processor 702, the memory 704, the timing device(s) 706, the optical sensor 708, the emitter 710, the communication interface 712, the processor 802, the memory 804, the location interface 806, the timing device(s) 808, the path of travel information store 308, the shopper event information store 310, the remote transceiver 812, the data interface 902, the path segment analyzer 904, the comparator 906, and/or the location data modifier 908 of the example tag 110 of FIGS. 1 and 7, the example data collector and processor 114 of FIGS. 1 and 8, and the example shopper path of travel inference apparatus 312 of FIGS. 3 and 9.

As shown in FIG. 15, the processor system 1510 includes a processor 1512 that is coupled to an interconnection bus 1514. The processor 1512 may be any suitable processor, processing unit, or microprocessor. Although not shown in FIG. 15, the system 1510 may be a multi-processor system and, thus, may include one or more additional processors that are identical or similar to the processor 1512 and that are communicatively coupled to the interconnection bus 1514.

The processor 1512 of FIG. 15 is coupled to a chipset 1518, which includes a memory controller 1520 and an input/output (I/O) controller 1522. A chipset provides I/O and memory management functions as well as a plurality of general purpose and/or special purpose registers, timers, etc. that are accessible or used by one or more processors coupled to the chipset 1518. The memory controller 1520 performs functions that enable the processor 1512 (or processors if there are multiple processors) to access a system memory 1524 and a mass storage memory 1525.

In general, the system memory 1524 may include any desired type of volatile and/or non-volatile memory such as, for example, static random access memory (SRAM), dynamic random access memory (DRAM), flash memory, read-only memory (ROM), etc. The mass storage memory 1525 may include any desired type of mass storage device including hard disk drives, optical drives, tape storage devices, etc.

The I/O controller 1522 performs functions that enable the processor 1512 to communicate with peripheral input/output (I/O) devices 1526 and 1528 and a network interface 1530 via an I/O bus 1532. The I/O devices 1526 and 1528 may be any desired type of I/O device such as, for example, a keyboard, a video display or monitor, a mouse, etc. The network interface 1530 may be, for example, an Ethernet device, an asynchronous transfer mode (ATM) device, an 802.11 device, a digital subscriber line (DSL) modem, a cable modem, a cellular modem, etc. that enables the processor system 1510 to communicate with another processor system.

While the memory controller 1520 and the I/O controller 1522 are depicted in FIG. 15 as separate functional blocks within the chipset 1518, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method of determining a path of travel within a retail or commercial establishment, comprising:
   generating a measured path of travel of a device in a retail or commercial establishment by determining locations of the device based on signals received at a plurality of different time instances from the device at a plurality of location detectors in the retail or commercial establishment using a first signal type, wherein each location is associated with a zone within the retail or commercial establishment;
   determining, using a processor, that a first location on the measured path of travel and corresponding to a first time instance may be incorrect by determining that a second location corresponding to a second time instance and a third location corresponding to a third time instance, which are both different from the first time instance, occur in a second zone within the retail or commercial establishment that is different from a first zone corresponding to the first location;
   based on a fourth time instance associated with a person detection event, selecting a person detector that generated the person detection event and is located at an entrance or exit of the second zone;
   analyzing the location of the person detector to determine that the first location is incorrect, wherein the person detector generates the person detection event using a second signal type different from the first signal type; and
   based on the analysis, correcting the first location by changing the first location to a fourth location that is located within the second zone.

2. A method as defined in claim 1, wherein the first signal type is one of a radio frequency signal or an acoustic signal, and the second signal type is an infrared signal.

3. A method as defined in claim 1, further comprising determining at least one of a product, an advertisement, or an informational display to which a person associated with the device was exposed based on an adjusted path of travel including the corrected first location, the second location, and the third location.

4. A method as defined in claim 1, further comprising analyzing direction information associated with the person detection event to determine that the first location is incorrect, the direction information indicating that the device entered the second zone.

5. A method as defined in claim 1, wherein the first zone is a first aisle, and the second zone is a second aisle adjacent to the first aisle.

6. A method as defined in claim 1, wherein the device is mounted to a shopping cart or shopping basket, or carried or worn by a shopper.

7. A method as defined in claim 1, further comprising correcting the first location in real time while the device is moving along the measured path of travel.

8. An apparatus to determine a path of travel within a retail or commercial establishment, comprising:
   a data interface configured to retrieve a measured path of travel of a device in a retail or commercial establishment generated by determining locations of the device based on signals received at a plurality of different time instances from the device at a plurality of location detectors in the retail or commercial establishment using a first signal type, wherein each location is associated with a zone within the retail or commercial establishment;
   a processor having a path segment analyzer configured to:
      determine that a first location on the measured path of travel and corresponding to a first time instance may be incorrect by determining that a second location corresponding to a second time instance and a third location corresponding to a third time instance, which are both different from the first time instance, occur in a second zone within the retail or commercial establishment that is different from a first zone corresponding to the first location;
      based on a fourth time instance associated with a person detection event, select a person detector that generated the person detection event and is located at an entrance or exit of the second zone;
      analyze the location of the person detector to determine that the first location is incorrect, wherein the person detector generates the person detection event using a second signal type different from the first signal type; and
   a location data modifier configured to, based on the analysis, correct the first location by changing the first location to a fourth location that is located within the second zone.

9. An apparatus as defined in claim 8, wherein the first signal type is one of a radio frequency signal or an acoustic signal, and the second signal type is an infrared signal.

10. An apparatus as defined in claim 8, wherein the processor is further to determine at least one of a product, an advertisement, or an informational display to which a person associated with the device was exposed based on an adjusted path of travel including the corrected first location, the second location, and the third location.

11. An apparatus as defined in claim 8, wherein the path segment analyzer is further configured to determine that the first location is incorrect based on direction information associated with the person detection event indicating that the device entered the second zone.

12. An apparatus as defined in claim 8, wherein the first zone is a first aisle, and the second zone is a second aisle adjacent to the first aisle.

13. An apparatus as defined in claim 8, wherein the device is mounted to a shopping cart or shopping basket, or carried or worn by a shopper.

14. An apparatus as defined in claim 8, wherein the location data modifier is further configured to correct the first location in real time while the device is moving along the measured path of travel.

15. A tangible computer readable medium having instructions stored thereon that, when executed by at least one computer processor, cause a machine to at least:
   generate a measured path of travel of a device in a retail or commercial establishment by determining locations of the device based on signals received at a plurality of different time instances from the device at a plurality of location detectors in the retail or commercial establishment using a first signal type, wherein each location is associated with a zone within the retail or commercial establishment;
   determine, using a processor, that a first location on the measured path of travel and corresponding to a first time instance may be incorrect by determining that a second location corresponding to a second time instance and a third location corresponding to a third time instance, which are both different from the first time instance, occur in a second zone within the retail or commercial establishment that is different from a first zone corresponding to the first location;

based on a fourth time instance associated with a person detection event, select a person detector that generated the person detection event and is located at an entrance or exit of the second zone;

analyze the location of the person detector to determine that the first location is incorrect, wherein the person detector generates the person detection event using a second signal type different from the first signal type; and based on the analysis, correct the first location by changing the first location to a fourth location that is located within the second zone.

16. A computer readable medium as defined in claim 15, wherein the first signal type is one of a radio frequency signal or an acoustic signal, and the second signal type is an infrared signal.

17. A computer readable medium as defined in claim 15, wherein the instructions further cause the machine to at least determine at least one of a product, an advertisement, or an informational display to which a person associated with the device was exposed based on an adjusted path of travel including the corrected first location, the second location, and the third location.

18. A computer readable medium as defined in claim 15, wherein the instructions further cause the machine to at least analyze direction information associated with the person detection event to determine that the first location is incorrect, the direction information indicating that the device entered the second zone.

19. A computer readable medium as defined in claim 15, wherein the first zone is a first aisle, and the second zone is a second aisle adjacent to the first aisle.

20. A computer readable medium as defined in claim 15, wherein the instructions further cause the machine to at least correct the first location in real time while the device is moving along the measured path of travel.

* * * * *